(12) United States Patent
Hisamatsu et al.

(10) Patent No.: US 7,493,648 B2
(45) Date of Patent: Feb. 17, 2009

(54) DATA TRANSMISSION DEVICE, DATA RECEIVING DEVICE, DATA TRANSMITTING METHOD, DATA RECEIVING METHOD, RECORDING DEVICE, PLAYBACK DEVICE, RECORDING METHOD, AND PLAYBACK METHOD

(75) Inventors: Ryuichiro Hisamatsu, Kanagawa (JP); Takamichi Mitsuhashi, Tokyo (JP); Tadashi Saito, Chiba (JP); Katsutoshi Sakao, Kanagawa (JP); Yasuhisa Nakajima, Kanagawa (JP); Hiroshige Okamoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 1492 days.

(21) Appl. No.: 09/832,229

(22) Filed: Apr. 10, 2001

(65) Prior Publication Data

US 2002/0003815 A1    Jan. 10, 2002

(30) Foreign Application Priority Data

| Apr. 11, 2000 | (JP) | ............................. 2000-109962 |
| Apr. 11, 2000 | (JP) | ............................. 2000-109963 |
| Apr. 11, 2000 | (JP) | ............................. 2000-109965 |
| Nov. 10, 2000 | (JP) | ............................. 2000-343104 |

(51) Int. Cl.
*H04N 7/16* (2006.01)
(52) U.S. Cl. .................. 725/136; 725/134; 725/142
(58) Field of Classification Search ................. 725/136, 725/142, 134
See application file for complete search history.

(56) References Cited

U.S. PATENT DOCUMENTS

| 5,621,578 A | 4/1997 | Matsumi et al. |
| 5,623,490 A | 4/1997 | Richter et al. |
| 5,959,796 A | 9/1999 | Matsumi et al. |
| 6,038,256 A | 3/2000 | Linzer et al. |
| 6,044,396 A | 3/2000 | Adams |
| 6,128,649 A * | 10/2000 | Smith et al. .................. 709/217 |
| 6,211,901 B1 * | 4/2001 | Imajima et al. ............... 725/93 |

(Continued)

FOREIGN PATENT DOCUMENTS

DE    40 13 204    10/1991

(Continued)

*Primary Examiner*—Hunter B. Lonsberry
(74) *Attorney, Agent, or Firm*—Frommer Lawrence & Haug LLP; William S. Frommer; Ellen Marcie Emas

(57) ABSTRACT

A data transmission device transmits a data broadcast using a narrow unused broadcasting band in a digital broadcast, and to record the data broadcast, which has been received, on a receiving side so that the receiving side can play back the data broadcast after a data stream is totally recorded. The transmission device generates a first data stream, which is recorded on a recording medium on a receiving side, and a second data stream including audio and video data, which is transmitted as a broadcasting program. The transmission device multiplexes the first and the second data streams and then transmits the multiplexed data stream. The transmission of the multiplexed data stream is controlled so that a transmission rate for the multiplexed data stream does not exceed the maximum transmission rate, and so that a transmission rate for the first data stream becomes lower than that for the second data stream. A receiving device records the first data stream on the recording medium, and permits the first data stream to be played back for use after the transmission completes.

34 Claims, 18 Drawing Sheets

U.S. PATENT DOCUMENTS

| | | | |
|---|---|---|---|
| 6,286,141 B1 * | 9/2001 | Browne et al. | 725/39 |
| 6,522,342 B1 * | 2/2003 | Gagnon et al. | 715/716 |
| 6,522,672 B1 * | 2/2003 | Matsuzaki et al. | 370/539 |
| 6,757,906 B1 * | 6/2004 | Look et al. | 725/45 |
| 6,804,825 B1 * | 10/2004 | White et al. | 725/87 |

FOREIGN PATENT DOCUMENTS

| | | |
|---|---|---|
| DE | 44 25 973 | 4/1995 |
| EP | 0 601 766 | 6/1994 |
| EP | 0 818 900 | 1/1998 |
| EP | 0 966 164 | 12/1999 |
| WO | WO 97 25791 | 7/1997 |

* cited by examiner

EXAMPLE OF BROADCASTING BAND
ASSIGNED TO BROADCASTING COMPANY

EXAMPLE OF BS DIGITAL BROADCAST

F I G. 13
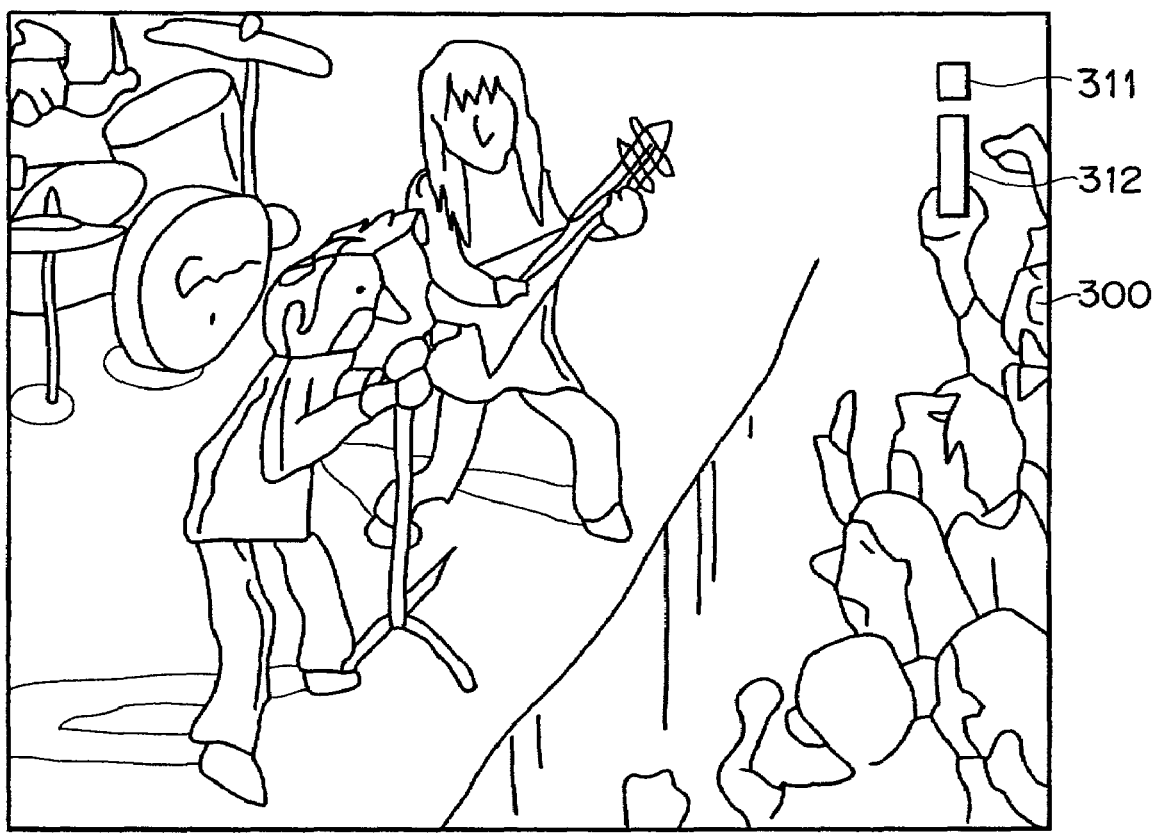

TRANSPONDERS

MPEG-TS

DATA TRANSMISSION DEVICE, DATA RECEIVING DEVICE, DATA TRANSMITTING METHOD, DATA RECEIVING METHOD, RECORDING DEVICE, PLAYBACK DEVICE, RECORDING METHOD, AND PLAYBACK METHOD

BACKGROUND OF THE INVENTION

The present invention relates to a data transmission device, a data receiving device, a data transmitting method, and a data receiving method, which can be used for digital satellite broadcasts and the like capable of multiplex transmission of, for example, program broadcasting and data broadcasting.

A satellite broadcast is a broadcast that uses an artificial satellite in an orbit around the earth keeping 36000 km above the earth. The satellite broadcast uses broadcasting satellites (BS), or communications satellites (CS). Both of the satellite broadcasts can be received using simple receiving facilities. Concerning such satellite broadcasts, the same transmitted wave from one transmission point, that is to say, a stationary orbit position, can cover all over the country. Because the satellite broadcasts can achieve a nationwide broadcast economically and efficiently, the satellite broadcasts provide nationwide popularization more easily than terrestrial broadcasting businesses, and at the same time provide a solution to a blind-spot problem. In Japan, as shown in FIG. 19, the one transmission point comprises seven transponders having a pair of channels. As channels currently being used, channels 5 and 7 are used for WOWOW and NHK1 respectively; and channels 9 and 11 are used for Hi-vision and NHK2 respectively.

In the BS broadcast like this, as shown in FIG. 20, MPEG-TS (MPEG Transport Stream) is generated. The MPEG-TS is a multiplexed data stream that is converted from a data stream including video and audio data at a coding bit rate corresponding to a given transmission rate in a given broadcasting band. According to this MPEG-TS, the multiplexed data stream is transmitted in the following order: video data V1, audio data A1, data D1, video data V2, audio data A2, data D2, . . . .

However, in the satellite broadcasts as described above, if a plurality of broadcasting programs having different transmission rates are multiplexed and transmitted, there occurs a problem that the maximum transmission rate is not utilized effectively.

On the other hand, if the broadcasting programs are transmitted at the maximum transmission rate, another problem arises: when multiplexing and transmitting various kinds of data as described above at random ratios, some data may not be visualized in real time because units of the data required for visualization on a receiving side cannot be transmitted in a block.

SUMMARY OF THE INVENTION

An object of the present invention is to provide a data transmission device, a data receiving device, a data transmitting method, and a data receiving method, which are characterized in that when multiplexing various kinds of data and transmitting them, or when dividing the various kinds of data into a plurality of bands and transmitting them, said data transmission device, said data receiving device, said data transmitting method, and said data receiving method are capable of transmitting the various kinds of data while utilizing a maximum transmission rate or a maximum bandwidth effectively, and are also capable of visualizing the various kinds of data in real time or in non-real time in response to data attributes and the like on a receiving side.

To achieve the above object, according to a first aspect of the present invention, there is provided a data transmission device including a first generator for generating a first data stream that is utilized after the first data stream is accumulated in a recording medium on a receiving side; second generator for generating a second data stream that includes audio data and video data; a multiplexer for multiplexing the first data stream and the second data stream; a transmitter for transmitting the multiplexed data stream that has been multiplexed by the multiplexer portion; and a controller for controlling the multiplexer so that a transmission rate for the first data stream becomes lower than that for the second data stream.

With this configuration, in response to a predefined maximum transmission rate, a transmission rate for the second data stream is kept so that the receiving side can display the second data stream in real time; and the first data stream, which is utilized after the first data stream is accumulated in a recording medium on a receiving side, is transmitted at a transmission rate that does not cause a problem of transmission of the second data stream. This achieves data transmission that makes full use of the maximum transmission rate.

According to a second aspect of the present invention, there is provided a data receiving device including a receiver for receiving a multiplexed data stream, in which a first data stream, which is utilized after the first data stream is accumulated in a recording medium on a receiving side, and a second data stream including audio data and video data are multiplexed into the multiplexed data stream in such a manner that a transmission rate for the first data stream becomes lower than that for the second data stream; a separator for separating the multiplexed data stream, which has been received by the receiver, into the first data stream and the second data stream; and a recorder for recording the first data stream, which has been separated by the separator, on a recording medium.

With this configuration, the second data stream, to which a sufficient transmission rate has been given, can be utilized for real-time displaying and the like. On the other hand, the first data stream, which has been multiplexed at a transmission rate lower than that of the second data stream, can be utilized after the first data stream is accumulated in a recording medium, that is, at the time when required units of data are accumulated. Therefore, data transmission making full use of the maximum transmission rate can be achieved.

According to a third aspect of the present invention, there is provided a transmission device including transmitting means for transmitting a data stream, which includes audio data and video data, using a program broadcasting band, and transmitting a data stream, which is utilized after this data stream is accumulated in a recording media on a receiving side, by allocating this data stream to a data broadcasting band; and controlling means for controlling the program broadcasting band and the data broadcasting band so that a sum of the bands does not exceed a given bandwidth.

With this configuration, the data stream including audio data and video data, which is transmitted using the program broadcasting band, can be utilized on the receiving side in real time; and the data stream to be transmitted using the data broadcasting band can be utilized after this data stream is accumulated in a recording media on the receiving side. Therefore, two kinds of data streams can be transmitted using the given bandwidth effectively.

According to a fourth aspect of the present invention, there is provided a receiving device including receiving means for receiving a broadcast in which a data stream including audio data and video data is transmitted using a program broadcasting band and other data stream, which is utilized after this data stream is accumulated in a recording media on a receiving side, is transmitted using a data broadcasting band to which this data stream is allocated, and the program broadcasting band and the data broadcasting band are controlled so that a sum of the bands does not exceed a given bandwidth; separating means for separating the data stream, which has been allocated to the data broadcasting band, from the broadcast that has been received by the receiving means; and recording means for recording the separated data stream.

With this configuration, data stream in the program broadcasting band can be utilized for real-time displaying and the like; and the data stream in the data broadcasting band can be utilized after this data stream is accumulated in a recording medium, that is, at the time when required units of data are accumulated. This achieves data transmission that makes full use of the maximum transmission rate.

According to a fifth aspect of the present invention, there is provided a data transmitting method including the step of generating a first data stream that is utilized after the first data stream is accumulated in a recording medium on a receiving side; generating a second data stream that includes audio data and video data; and transmitting a multiplexed data stream that has been multiplexed from the first data stream and the second data stream; wherein said multiplexed data stream is multiplexed in such a manner that a transmission rate for the first data stream becomes lower than that for the second data stream.

With this configuration, in response to a predefined maximum transmission rate, a transmission rate for the second data stream is kept so that the receiving side can display the second data stream in real time; and the first data stream, which is utilized after the first data stream is accumulated in a recording medium on a receiving side, can be transmitted at a transmission rate that does not cause a problem of transmission of the second data stream. Therefore, this achieves data transmission that makes full use of the maximum transmission rate.

According to a sixth aspect of the present invention, there is provided a data receiving method including the step of receiving a multiplexed data stream that is multiplexed from a first data stream, which is utilized after the first data stream is accumulated in a recording medium on a receiving side, and a second data stream including audio data and video data in such a manner that a transmission rate for the first data stream becomes lower than that for the second data stream, separating the multiplexed data stream, which has been received, into the first data stream and the second data stream; and recording the first data stream, which has been separated, on a recording medium.

With this configuration, the second data stream, to which a sufficient transmission rate has been given, can be utilized for real-time displaying and the like. On the other hand, the first data stream, which has been multiplexed at a transmission rate lower than that of the second data stream, can be utilized after the first data stream is accumulated in a recording medium, that is, at the time when required units of data are accumulated. Therefore, data transmission making full use of the maximum transmission rate can be achieved.

According to a seventh aspect of the present invention, there is provided a transmitting method including the step of transmitting a data stream including audio data and video data, using a program broadcasting band, and transmitting other data stream, which is utilized after this data stream is accumulated in a recording media on a receiving side, by allocating this data stream to a data broadcasting band; and controlling the program broadcasting band and the data broadcasting band so that a sum of the bands does not exceed a given bandwidth.

With this configuration, the data stream including audio data and video data, which is transmitted using the program broadcasting band, can be utilized on the receiving side in real time; and the data stream to be transmitted using the data broadcasting band can be utilized after this data stream is accumulated in a recording media on the receiving side. Therefore, two kinds of data streams can be transmitted using the given bandwidth effectively.

According to a eighth aspect of the present invention, there is provided a receiving method including the step of receiving a broadcast in which a data stream including audio data and video data is transmitted using a program broadcasting band and other data stream, which is utilized after this data stream is accumulated in a recording media on a receiving side, is transmitted using a data broadcasting band to which this data stream is allocated, and the program broadcasting band and the data broadcasting band are controlled so that a sum of the bands does not exceed a given bandwidth, and recording the data stream, which has been allocated to the data broadcasting band, from the broadcast received by the receiving step.

With this configuration, the data stream in the program broadcasting band can be utilized for real-time displaying and the like; and the data stream in the data broadcasting band can be utilized after this data stream is accumulated in a recording medium, that is, at the time when required units of data are accumulated. This achieves data transmission that makes full use of the maximum transmission rate.

According to an ninth aspect of the present invention, there is provided a recording device including inputting means for inputting at least a data stream that is multiplexed from the first data stream including audio and video data, and from the second data stream including audio and video data transmitted as a broadcasting program; separating means for separating the multiplexed data stream into the first data stream and the second data stream; recording medium on which the first and the second separated data streams are recorded; playback means for playing back the first data stream that has been recorded on the recording medium; and record controlling means for controlling a given area of the recording medium so that only the first data stream is permitted to be recorded on the given area.

With this configuration, it becomes possible to reserve an area, which can be used by users in advance freely. In addition to it, a provider can also allow the users to download contents freely.

According to a tenth aspect of the present invention, there is provide a recording device including inputting means for inputting at least a data stream that is multiplexed from the first data stream including audio and video data, and the second data stream including audio and video data transmitted as a broadcasting program; separating means for separating the multiplexed data stream into the first data stream and the second data stream; recording medium on which the first and the second separated data streams are recorded; playback means for playing back the first data stream that has been recorded on the recording medium; and record controlling means for controlling a given area of the recording medium so that only the first data stream is permitted to be recorded on the given area; wherein an area of said recording media is divided into a provider-specific area and an user-specific area.

With this configuration, dividing the recording medium into the provider area and the user area provides an advantage that those areas can be used freely without mutual interference.

According to an eleventh aspect of the present invention, there is provided a playback device comprising a recording medium for recording at least the first data stream including audio and video data, and the second data stream including audio and video data, which is transmitted as a broadcasting program; and a playback control means for playing back the first data stream that is recorded on a predefined area of the recording medium.

With this configuration, it becomes possible to reserve an area, which can be used by users in advance freely. In addition to it, a provider can also allow the users to download contents freely.

According to a twelfth aspect of the present invention, there is provided a recording method including the step of inputting at least a data stream that is multiplexed from a first data stream including audio and video data, and a second data stream including audio and video data transmitted as a broadcasting program; separating the multiplexed data stream into the first data stream and the second data stream; recording the first and the second separated data streams on a given recording medium; playing back the first data stream that has been recorded on the recording medium; and controlling a given area of the recording medium so that only the first data stream is permitted to be recorded on the given area.

With this configuration, it becomes possible to reserve an area, which can be used by users in advance freely. In addition to it, a provider can also allow the users to download contents freely.

According to a thirteenth aspect of the present invention, there is provided a playback method including the step of recording at least a first data stream including audio and video data, and a second data stream including audio and video data, which is transmitted as a broadcasting program, on a recording medium; and playing back the first data stream that is recorded on a predefined area of the recording medium.

With this configuration, it becomes possible to reserve an area, which can be used by users in advance freely. In addition to it, a provider can also allow the users to play back contents and the like, which have been written freely.

BRIEF DESCRIPTION OF THE DRAWINGS

FIG. 13 is a block diagram illustrating a specific example of a screen, which displays animation, in the digital receiving device shown in FIG. 7;

DETAILED DESCRIPTION OF THE INVENTION

Hereinafter, preferred embodiments of the present invention will be described in detail with reference to the drawings.

An embodiment of a satellite-broadcast business management system, to which a business management method and a business management device according to the present invention are applied, will be described.

Figure 1:
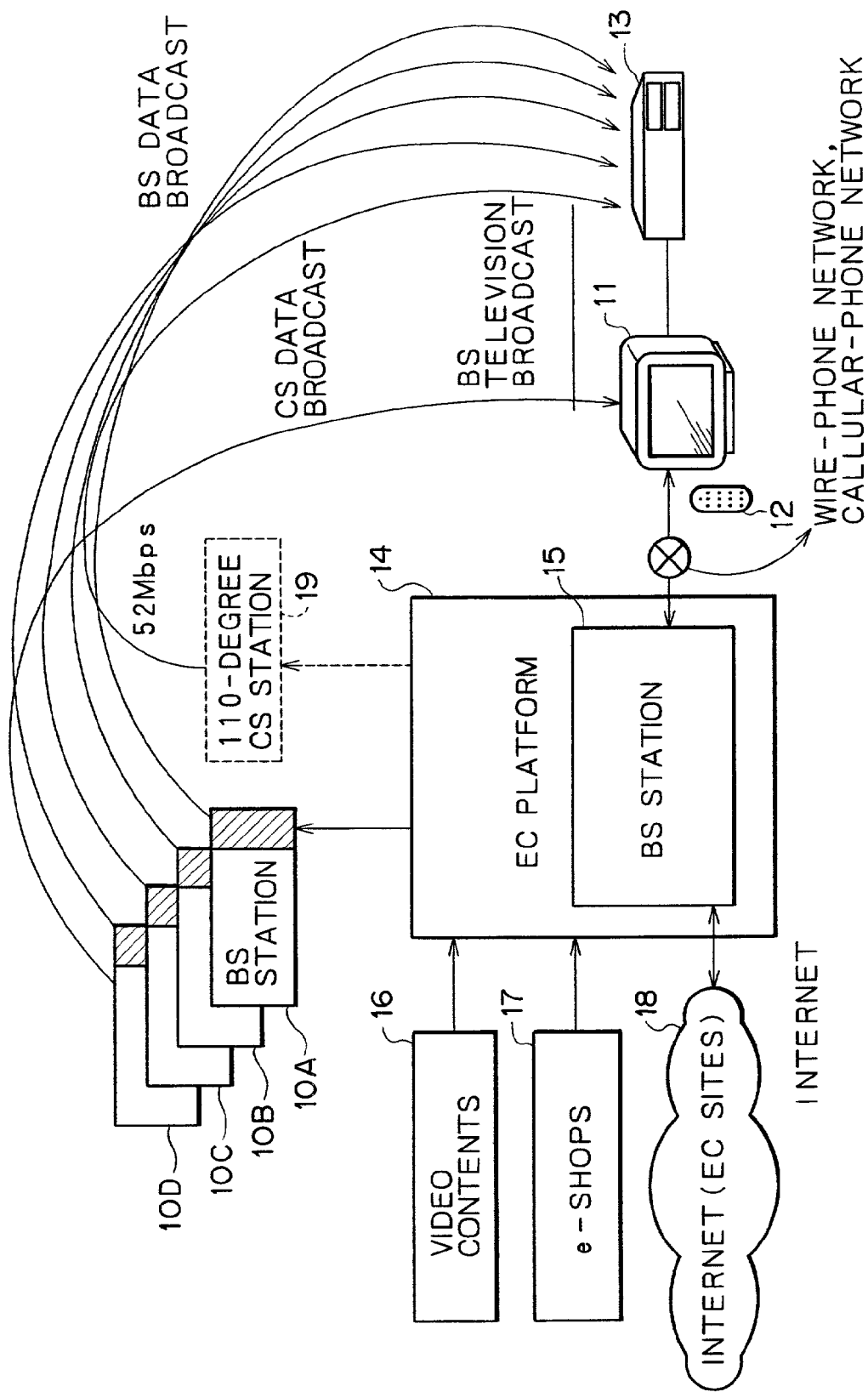
FIG. 1 is a brief configuration diagram illustrating operation of a BS station for constructing a satellite broadcasting system that is used in an embodiment of the present invention.

FIG. 1 is a diagram illustrating an outline of the satellite-broadcast business management system according to the embodiments.

This business management system comprises BS stations 10A to 10D as satellite-broadcasting companies that deliver video contents using for example a satellite broadcast as an existing BS system; and a television receiver 11 that is capable of receiving and displaying the video contents delivered by the BS stations 10A to 10D. By the way, in FIG. 1, a shaded portion in each of the BS stations from 10A to 10D is a portion that performs transmission in a data broadcasting band. In addition, a recording medium (in this embodiment, a hard disk 13 having recording capacity of 36 GB) for recording a BS data broadcast is connected to the television receiver 11. In this connection, when a transmission rate of the broadcast is 4 Mbps (SD) for example, the hard disk 13 having recording capacity of 36 GB is capable of recording the broadcast for 20 hours.

Moreover, this system also comprises an EC platform 14 that provides a BS station with the supplied video contents and e-shop company information.

Figure 2:
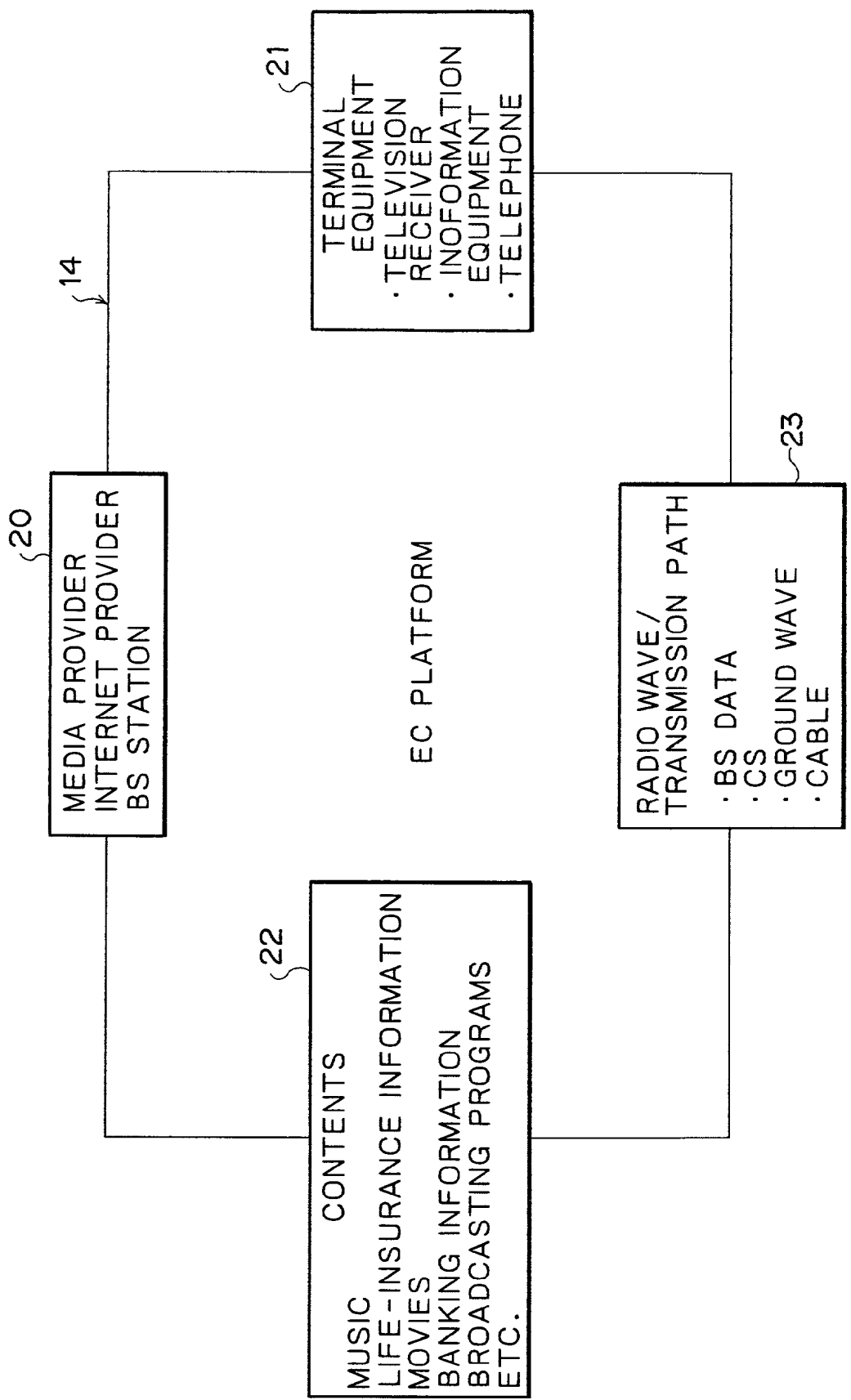
FIG. 2 is a brief conceptual diagram illustrating an EC platform comprising the BS station shown in FIG. 1, which combines contents, radio waves/transmission paths, and terminal equipment organically.

As shown in FIG. 2, this EC platform 14 has a function of combining a media provider 20, terminal equipment 21, contents 22, and radio waves/transmission paths 23 organically. The media provider 20 comprises an Internet provider, a BS station, and the like. The terminal equipment 21 comprises a television receiver 11, information equipment (such as a personal computer), a cellular phone, a wire telephone, and the like. The contents 22 range over many genres including music, life-insurance information, movies, banking information, broadcasting programs. The radio waves/transmission paths 23 have a configuration that covers BS data, CS, cables, and the like totally.

Furthermore, this system can complement a 110-degree CS station 19 in future as necessary. This 110-degree CS station 19 performs a CS data broadcast at 52 Mbps for example.

Figure 3:
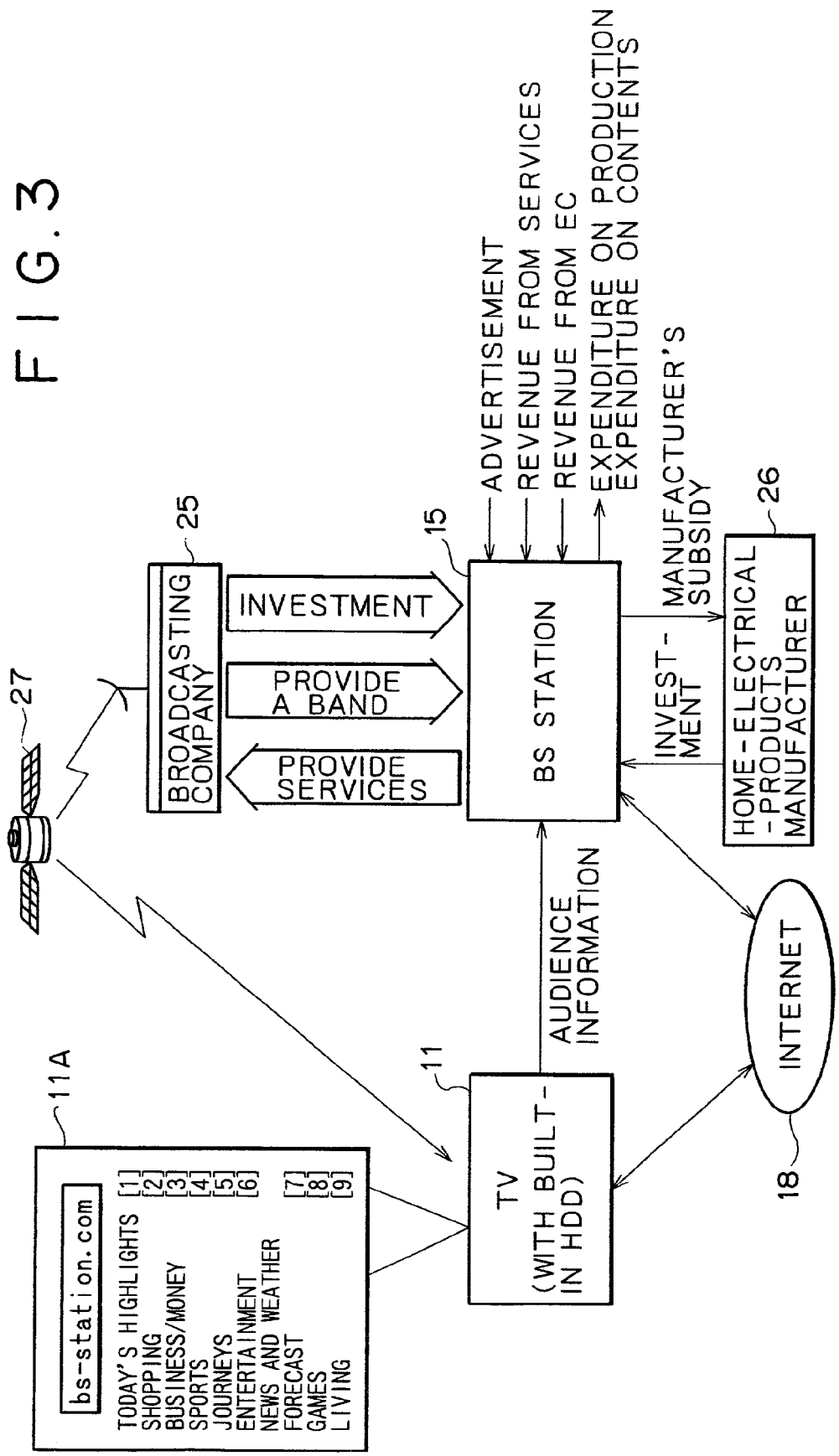
FIG. 3 is an explanatory diagram illustrating functions and a business structure of the BS station shown in FIG. 1.

A BS station 15 has the following functions organizing and transmitting an accumulation-type broadcast; customer authentication; settlement of a bill; delivering and managing a hard disk; customer support; network gateway; and the like. As shown in FIG. 3, its business structure is based on investment from a broadcasting company 25 and a home-electrical-products manufacturer 26. Between the BS station 15 and the broadcasting company 25, a given broadcasting band (in the embodiment, about 2 Mbps) is provided. Services such as video contents and e-commerce information are provided using the band of about 2 Mbps.

In addition, the BS station 15 is provided with a recording medium (in the embodiment, a hard-disk recording device) for accumulating BS data, which is supplied to consumer free of charge or at a price lower than cost, by the home-electrical-products manufacturer 26. In exchange for the recording medium, the BS station 15 pays subsidy to the home-electrical-products manufacturer 26.

Moreover, on an audience side, there are a television receiver 11 comprising a dedicated recording medium (hard disk) which is capable of receiving a BS data broadcast and accumulating it temporarily, on board or separately. After receiving the BS data broadcast provided by the BS station, the BS data broadcast can be recorded on this recording medium. Regarding the recording medium, data is recorded in FIFO method; more specifically, the oldest recorded data is deleted first in order to record new data. Furthermore, the recording medium permits the BS data broadcast, which has been received and accumulated temporarily, to be selected at pleasure for viewing.

To be more specific, as shown in FIG. 3, if a menu screen 11A of 'bs-station.com' is selected, selecting one from genres including 'Today's highlights', 'Shopping', 'Business/money', 'Sports', 'Journeys', 'Entertainment', 'News and weather forecast', 'Games', and 'Living' accesses the BS data, which is currently accumulated in the recording media, to view the desired information. If 'Shopping' is selected, it is possible to view and purchase a commodity. This point is described in detail later.

Figure 4:
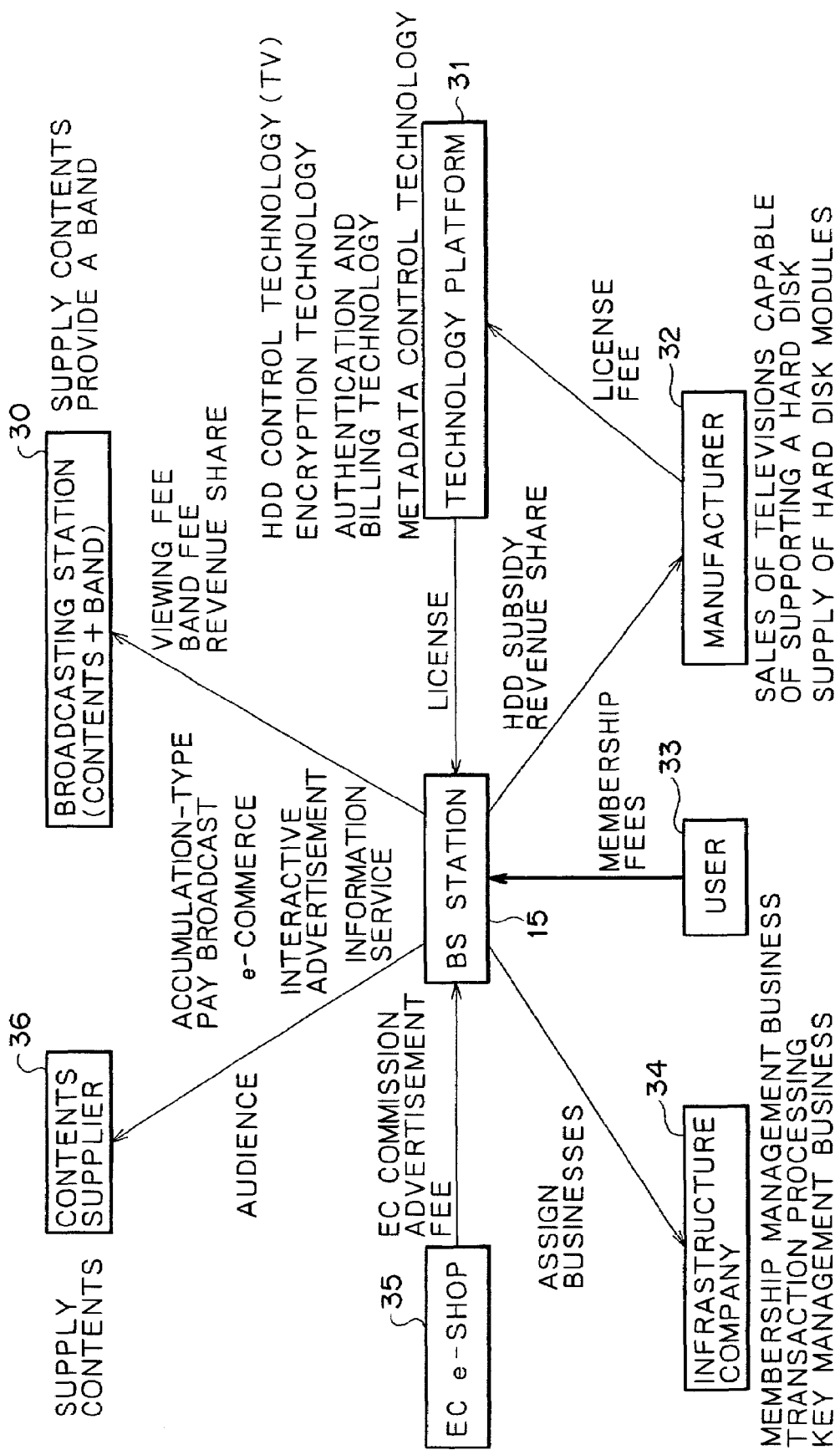
FIG. 4 is a brief conceptual diagram illustrating a business model of the BS station shown in FIG. 1.

As shown in FIG. 4, a business model of the BS station, which has the functions and the business form as described above, includes a technology platform 31 that solves technical problems, a manufacturer 32 that produces television receivers capable of supporting hard disks, a user 33 who is charged for membership, an infrastructure company 34 that manages memberships, an EC e-shop 35 that promotes e-commerce, a contents supplier 36 that supplies various contents, a broadcasting station 30 that transmits contents in a band of about 2 Mbps.

The technology platform 31 supplies the manufacturer 32 with a HDD control technology (the HDD (hard disk drive), in which BS data is accumulated, is connected to the television receiver), an encryption technology, authentication and billing technologies, and a metadata control technology. Moreover, the technology platform 31 gives licenses for those technologies to the BS station 15 and receives license fees from the manufacturer 32 to make both ends meet.

The meta-data control technology is a control technology that makes a massed group of data and plays it back for use, if a HDD of the receiving device accumulates data broadcasts that are broadcasted using an empty band from a range of broadcasting band possessed by the broadcasting station. Moreover, there are various functions from the viewpoint of software: excerpting data broadcasts, which suits the preferences of each user, to accumulate them; and accumulating information having a good user-selection rate by priority; and others.

Moreover, concerning the data broadcast accumulated in a recording medium, when accumulating received data broadcasts successively, it is possible to control accumulation in such a manner that the oldest accumulated data broadcast is deleted first in order to accumulate a new data broadcast if capacity of an accumulation area becomes lower than or equal to a given value.

Manufacturer 32 supplies the user with the television receiver capable of supporting a hard disk and a hard disk module, and makes both ends meet by obtaining revenue of HDD subsidy and revenue share from the BS station 15 instead of paying the license fee to the technology platform 31.

The user 33 pays membership fee for receiving contents (in this case, BS data from the broadcasting station) to view them. The infrastructure company 34 carries out businesses for the BS station 15, more specifically, carries out membership management business, transaction processing, and key management business in place of the BS station 15.

The EC e-shop company 35 can establish an environment, which enables a virtual shopping, in exchange for paying EC commission and advertisement fee to the BS station 15.

The content supplier 36 makes both ends meet by obtaining viewing fee for various contents such as video contents, and music (irrespective of kinds of contents if they are in the same field) from the BS station 15.

The broadcasting station 30 broadcasts data broadcasts using an assigned broadcasting band; in the case of BS digital broadcast, it is an empty broadcasting band (for example, 2 Mbps) in a broadcasting band of 24 Mbps. This data-broadcast band varies according to a broadcasting program.

The BS station 15 makes both ends meet by returning the revenue share in addition to the viewing fee and band fee to the broadcasting station.

Next, actual flows of commodities and services as well as a flow of money in the business model of the BS station having the configuration as described above are described with reference to FIGS. 5 and 6.

Figure 5:
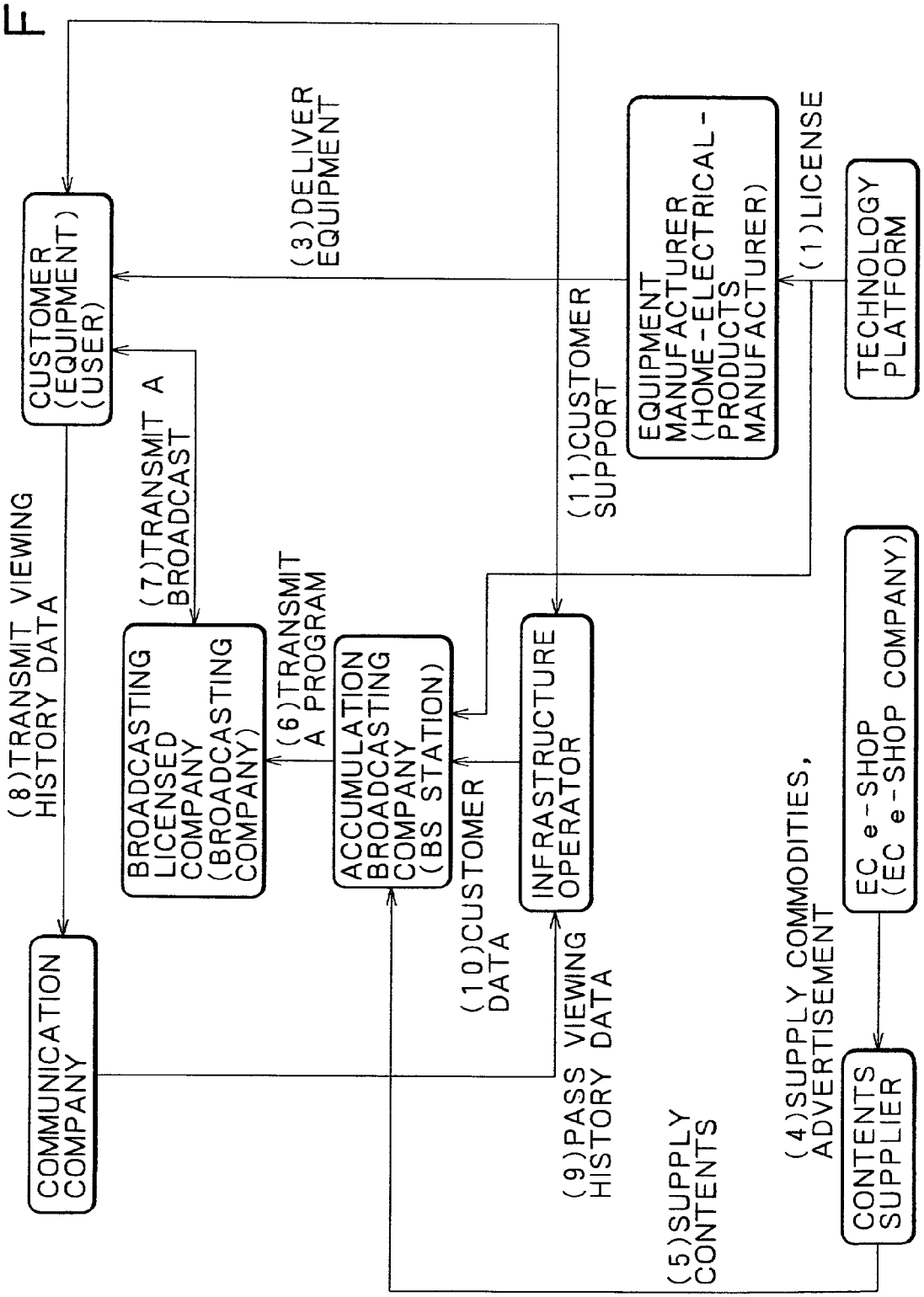
FIG. 5 is a block diagram illustrating a flow of commodities and services in relation to the BS station shown in FIG. 1.

As shown in FIG. 5, the flow of commodities and services includes the following: (1) the technology platform makes a license agreement with an equipment manufacturer; and (2) the technology platform also makes a license agreement with an accumulation broadcasting company that constructs a BS station.

(3) The equipment manufacturer delivers equipment to a customer who has applied for a data broadcast. This equipment is a television receiver in which a HDD is built, or a television receiver equipped with a HDD. This equipment is equipped with a recording medium capable of accumulating the data broadcast, and has software capable of controlling and playing back this accumulated data broadcast.

In addition, this equipment is provided free of charge or at a low price. Because main purposes are content fee and virtual shopping resulting from using accumulated data broadcast, a profit from the equipment itself is minimized.

(4) The EC e-shop, which provides virtual shopping, supplies a content supplier with commodities and advertisement.

(5) The content supplier supplies the accumulation broadcasting company with contents.

(6) When the accumulation broadcasting company accepts video contents and contents for e-commerce from the contents supplier, the accumulation broadcasting company sends a data broadcasting program containing these contents to a broadcasting licensed company (BS station or broadcasting station).

(7) After the broadcasting licensed company receives the data broadcast from the accumulation broadcasting company, the broadcasting licensed company broadcasts the data broadcast using an empty broadcasting band of broadcasting programs (WOWOW, NHK1, NHK2) that are broadcasted in a broadcasting band of 24 Mbps.

(8) When the equipment on the customer side receives this data broadcast, the equipment reconstructs the data broadcast to one contents data and accumulates it, and permits desired contents to be viewed by menu operation. These contents viewed are sent to a communication company as viewing history data.

(9) When the communication company receives the viewing history data from the customer, the communication company permits data broadcasts, which are viewed now and have been viewed in the past, to be extracted, and then transmits each customer's viewing history data to the infrastructure company.

(10) When the infrastructure company receives the viewing history data from the communication company, the infrastructure company extracts contents, their genres, and the like, which are viewed by each customer by choice, using the viewing history data. After that, the infrastructure company generates customer data and sends them to the accumulation broadcasting company. The accumulation broadcasting company selects programs having high current audience share, and also selects contents of e-commerce, based on the customer data. After that, the accumulation broadcasting company organizes a broadcasting program, and then sends this data broadcast to the broadcasting licensed company. This enables transmittance of only data broadcasts that suit customer's needs. As a result, substantial contents can be supplied.

Next, a flow of money resulting from the above-mentioned flow of commodities and services is described with reference to FIG. 6.

First of all, (1) the customer views the data broadcast of the accumulation broadcasting company. Then, a membership is registered in order to do virtual shopping by e-commerce included in the data broadcast. As a result, a monthly membership fee that consists of monthly fixed expenditures, an additional service fee (charged when allowed hours of use is exceeded, for example), and the like are paid to the accumulation broadcasting company.

(2) The accumulation broadcasting company pays HDD subsidy and EC revenue share, which is returned as a given profit, to the equipment manufacturer that supplies the customer with equipment for enabling the customer having membership to view data broadcasts—to be more specific, a television receiver having a recording medium capable of accumulating the data broadcasts, or equipment consisting of a recording medium that can be connected to a television receiver.

(3) The accumulation broadcasting company pays a contents fee commensurate with the contents to the contents supplier who makes video contents and contents for performing e-commerce.

(4) The accumulation broadcasting company pays a band fee to the broadcasting licensed company for the purpose of broadcasting the data broadcast.

(5) The accumulation broadcasting company pays business commission and EC revenue share, which is returned as a given profit, to the infrastructure company that carries out various surrogate businesses.

(6) The infrastructure company pays a line fee to the communication company.

(7) The accumulation broadcasting company pays a license fee to the technology platform.

(8) The equipment manufacturer pays a license fee to the technology platform.

(9) The EC e-shops pay an e-shop fee and an advertisement fee to the contents supplier.

(10) The EC e-shops pay EC commission, e-shop commission, and an advertisement fee to the accumulation broadcasting company EC.

Figure 6:
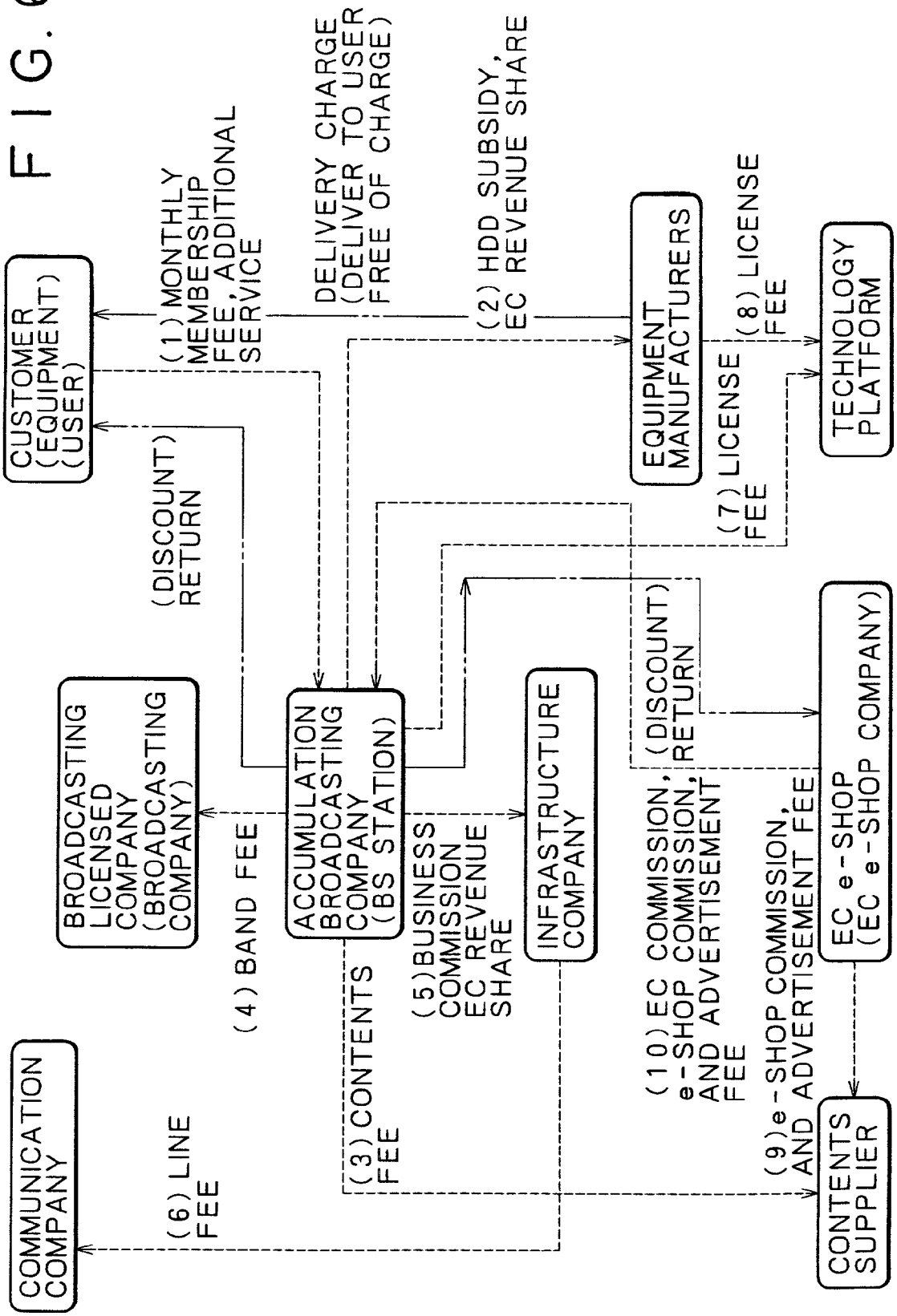
FIG. 6 is a block diagram illustrating a flow of money in relation to the BS station shown in FIG. 1.

A business management method for managing the flow of money as described above to calculate profits, and for returning the profits to companies and users, which are related to the accumulation broadcasting company, as appropriate, is described hereafter with reference to FIGS. 5 and 6.

The accumulation broadcasting company manages the flow of money by a business management device. The business management device includes inputting means for providing payments-balance information and control means for controlling the payments-balance so that part of profits is returned to the service or the advertisement fee. The part of the profits to be returned is obtained based on a cost required to provide the user with a recording device corresponding to contents that are supplied for the user by a delivery company, a use fee for contents paid by this user, and a charge obtained from given services and/or advertisement included in the contents.

Using this business management device, the accumulation broadcasting company calculates balance of payments from a cost required to provide the user with a television receiver having a HDD built-in or a television receiver equipped with the HDD as a recording device corresponding to contents such as virtual shops (those television receivers are provided for the user by the equipment manufacturer as an equipment delivery company); a monthly membership fee and an additional service fee, and the like that are use fees of contents delivered by a virtual shop, and that are paid by the users to whom the equipment is provided; and EC sales commission, exhibition fee, advertisement fee, and the like, equivalent to a charge obtained from the given service or the advertisement included in this contents. The accumulation broadcasting company controls the part of the profits to be returned to the service or the advertisement fee according to the profits.

For example, if the accumulation broadcasting company controls the part of the profits to be returned to the equipment (producing) manufacturer of the recording device according to the profits, a given amount of money is returned to the equipment manufacturer as EC revenue share. In this case, said amount is determined by managing means for managing the number of the recording devices that have been provided to the users, and that correspond to contents supplied to the user by the delivery company, and determining means for determining a charge, which is paid to the given service or the advertisement included in the contents, according to the number of the recording devices.

Using such a business management device, distribution of the business profit is managed, and a part of the business profits is returned to the monthly membership fee and the additional service fee, which are equivalent to EC revenue share of the equipment (producing) manufacturer of the recording devices and the contents use fee paid by the user.

A business management system like this can be applied not only to satellite broadcasts but also to digital broadcasts that can be multiplexed with a data broadcast.

Next, a transmission device and a receiving device, for handling multiplexed data, and also a method for transmitting and receiving multiplexed data, which are shown in embodiments of the present invention, are described using a digital-broadcasting transmission device and a digital-broadcasting receiving device used in the business management system of BS digital broadcast as described above.

Figure 7:
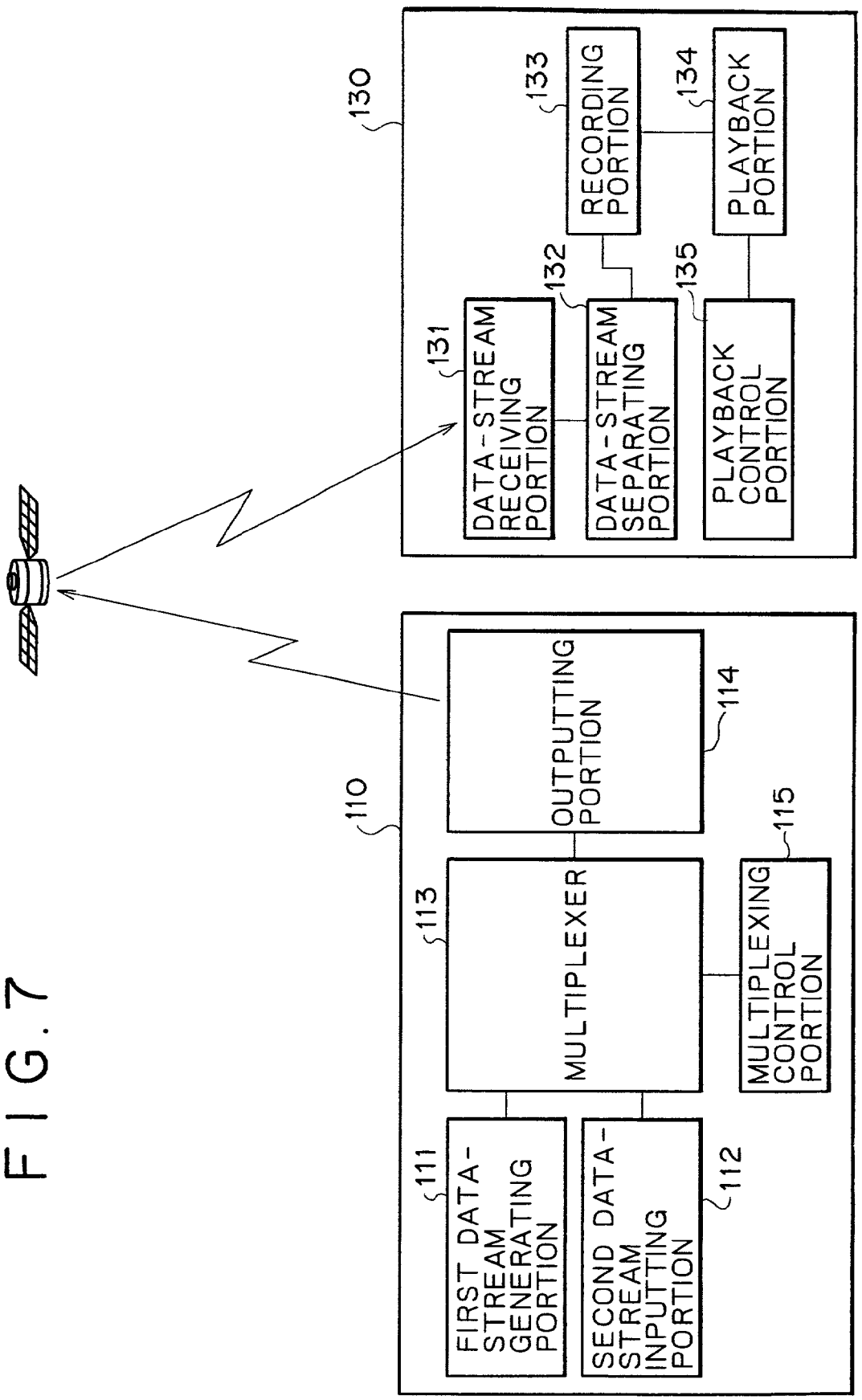
FIG. 7 is a brief configuration diagram illustrating a digital-broadcasting transmission device and a digital-broadcasting receiving device in an embodiment of the present invention.

FIG. 7 is a block diagram illustrating configurations of the digital-broadcasting transmission device and the digital-broadcasting receiving (recording) device of this embodiment.

The digital-broadcasting transmission device 110 includes at least a first data-stream generating portion 111 for generating a first data stream that includes audio and video data, a second data-stream inputting portion 112 for receiving a second data stream including audio and video data, which is transmitted as a broadcasting program, a multiplexer 113 for multiplexing the first data stream and the second data stream, an outputting portion 114 for outputting the multiplexed data stream, and a multiplexing control portion 115 for controlling multiplexing so that a transmission rate of the first data stream becomes lower than a coding bit rate of the first data stream.

A digital-broadcasting receiving device 130 includes a data-stream receiving portion 131 for receiving a data stream that is multiplexed from the first data stream including at least audio and video data, which has been generated and transmitted in the digital-broadcasting transmission device 110, and the second data stream including audio and video data, which is transmitted as a broadcasting program, and that is multiplexed in such a manner that the transmission rate of the first data stream becomes lower than the coding bit rate of the first data stream.

The digital-broadcasting receiving device 130 further includes a data-stream separating portion 132 for separating the data stream, which has been received by the data-stream receiving portion 131, into the first data stream and the second data stream, a recording portion 133 for recording the separated data streams, a playback portion 134 for playing back those recorded data streams, and a playback control portion 135 for controlling playback so that, when said playback portion 134 records the first data stream, playback of the first data stream becomes possible after the first data stream is totally recorded.

Figure 8:
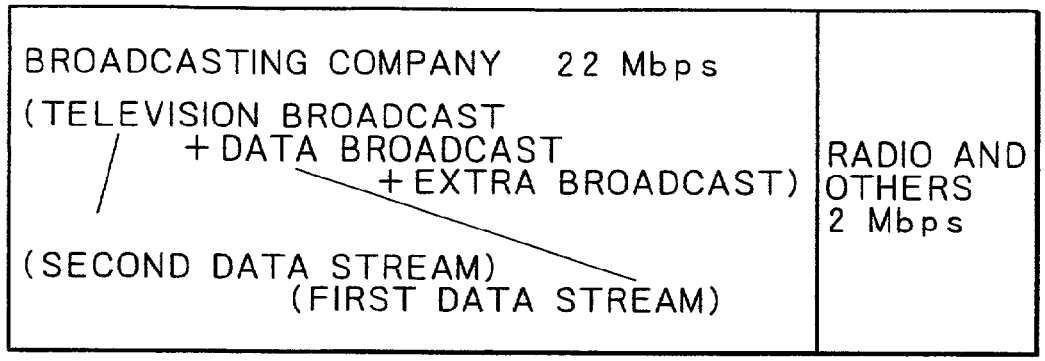
FIG. 8 is a conceptual diagram illustrating an example of a broadcasting band assigned to one broadcasting company in the embodiment shown in FIG. 7.

The first data-stream generating portion 111 is configured to generate the first data stream from at least video and audio contents and/or contents for e-commerce. As shown in FIG. 8, the transmission rate assigned for this first data stream is about 2 Mbps, which is considerably narrow, whereas a broadcasting band for the first and the second data streams has 24 Mbps as the maximum transmission rate.

To be more specific, a broadcasting band assigned for one broadcasting company has 24 Mbps in total, which consists of, for example, data broadcast corresponding to the first data stream, television broadcast corresponding to the second data stream, extra broadcast, radio and others.

Figure 9:
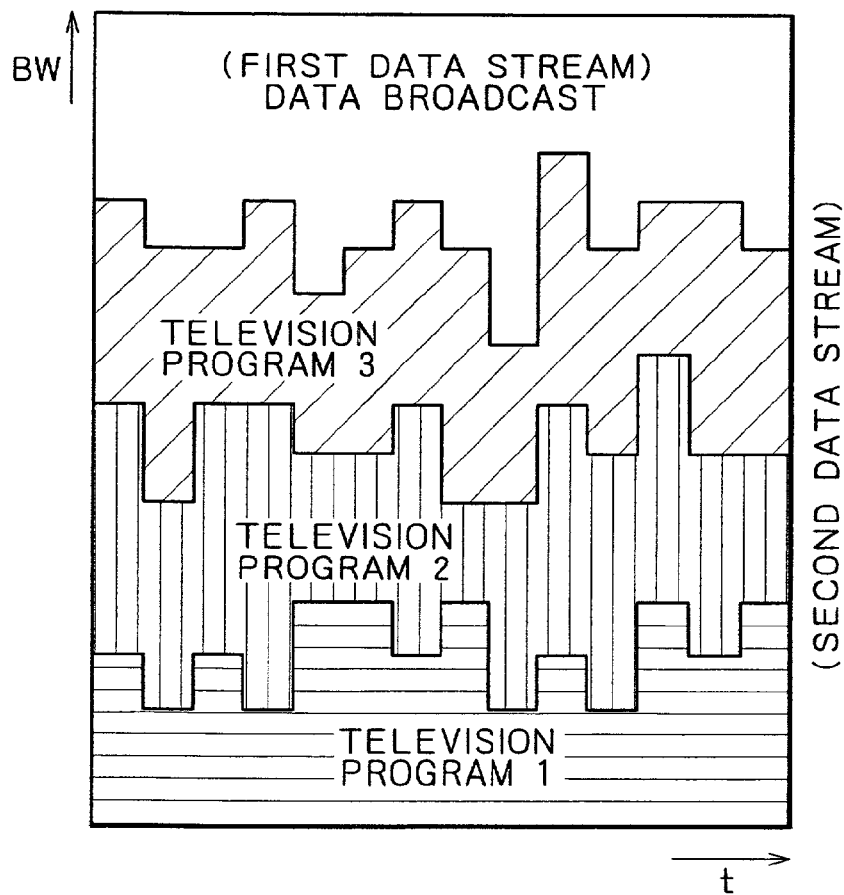
FIG. 9 is a conceptual diagram illustrating an assignment of transmission rates used in a BS digital broadcast shown in FIG. 7.

In this case, as shown in FIG. 9, a transmission rate used for the data broadcast corresponding to the first data stream is about 2 Mbps, which is the remainder of the transmission rate required when one broadcasting company transmits television programs 1, 2, 3 by multiplexing them. Making full use of this transmission rate of about 2 Mbps, the data broadcast (the first data stream) is multiplexed with the television broadcast (the second data stream) to be transmitted.

Figure 10:
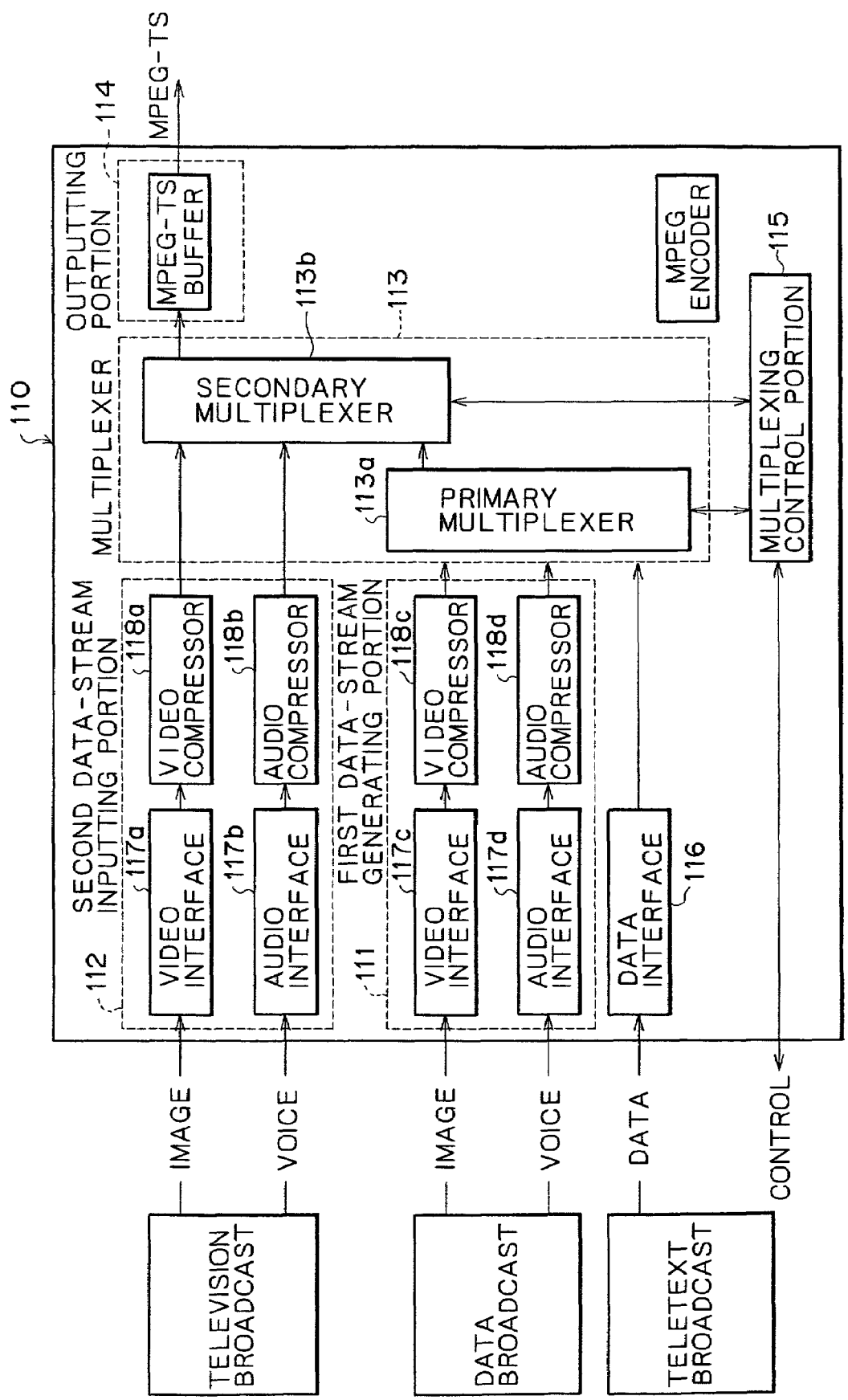
FIG. 10 is a block diagram illustrating a configuration example of a MPEG decoder portion in the digital transmission device shown in FIG. 7.

Next, a specific configuration of an encoder of the transmission device 110, which multiplexes the data broadcast with the television broadcast with compression and transmits it in response to this transmission rate of the data broadcast, is described with reference to FIG. 10.

The encoder includes a second data-stream inputting portion 112 for inputting video and audio data, which are transmitted as a broadcasting program of BS digital broadcast, a first data-stream generating portion 111 for inputting video (images) and audio (voice) data of the data broadcast, a multiplexer 113 for multiplexing the first and the second data streams, a multiplexing control portion 115 for controlling multiplexing, an outputting portion 114 for outputting the multiplexed data stream, and an interface 116 that corresponds to teletext broadcasting.

The second data-stream inputting portion 112 includes a video interface 117a and an audio interface 117b that input video and audio data, respectively, and a video compressor 118a and an audio compressor 118b that compress the inputted data from those interfaces 117a and 117b respectively by means of, for example, MPEG method.

The first data-stream generating portion 111 includes a video interface 117c and an audio interface 117d that input image and voice data, respectively, and a video compressor 118c and an audio compressor 118d that compress the inputted data from those interfaces 117c and 117d, respectively.

The multiplexer 113 includes a primary multiplexer 113a and a secondary multiplexer 113b. The primary multiplexer 113a multiplexes the compresses data broadcast, that is to say, the first data stream. In this case, the first data stream is multiplexed at a coding rate of 4 Mbps in the embodiment.

On the other hand, the secondary multiplexer 113b multiplexes the first data stream (data broadcast) having a coding rate of 4 Mbps into the second data steam (television broadcast) by changing a transmission rate of the first data stream to about 2 Mbps.

The multiplexing control portion 115 controls the above-mentioned multiplexing so that the first data stream having a coding rate of 4 Mbps is multiplexed at a transmission rate of 2 Mbps. To be more specific, although the first data stream has the coding rate of 4 Mbps originally, the first data stream is controlled so that a coding rate after multiplexing becomes 2 Mbps, which is lower than the original coding rate. In other words, it becomes twice as slow as the original coding rate if it is calculated in time base. In this manner, by controlling the first data stream (data broadcast) so that it is transmitted at a rate lower than the original coding rate, it is possible to transmit the first data stream at the narrow-band transmission rate that has been obtained.

Figure 11:
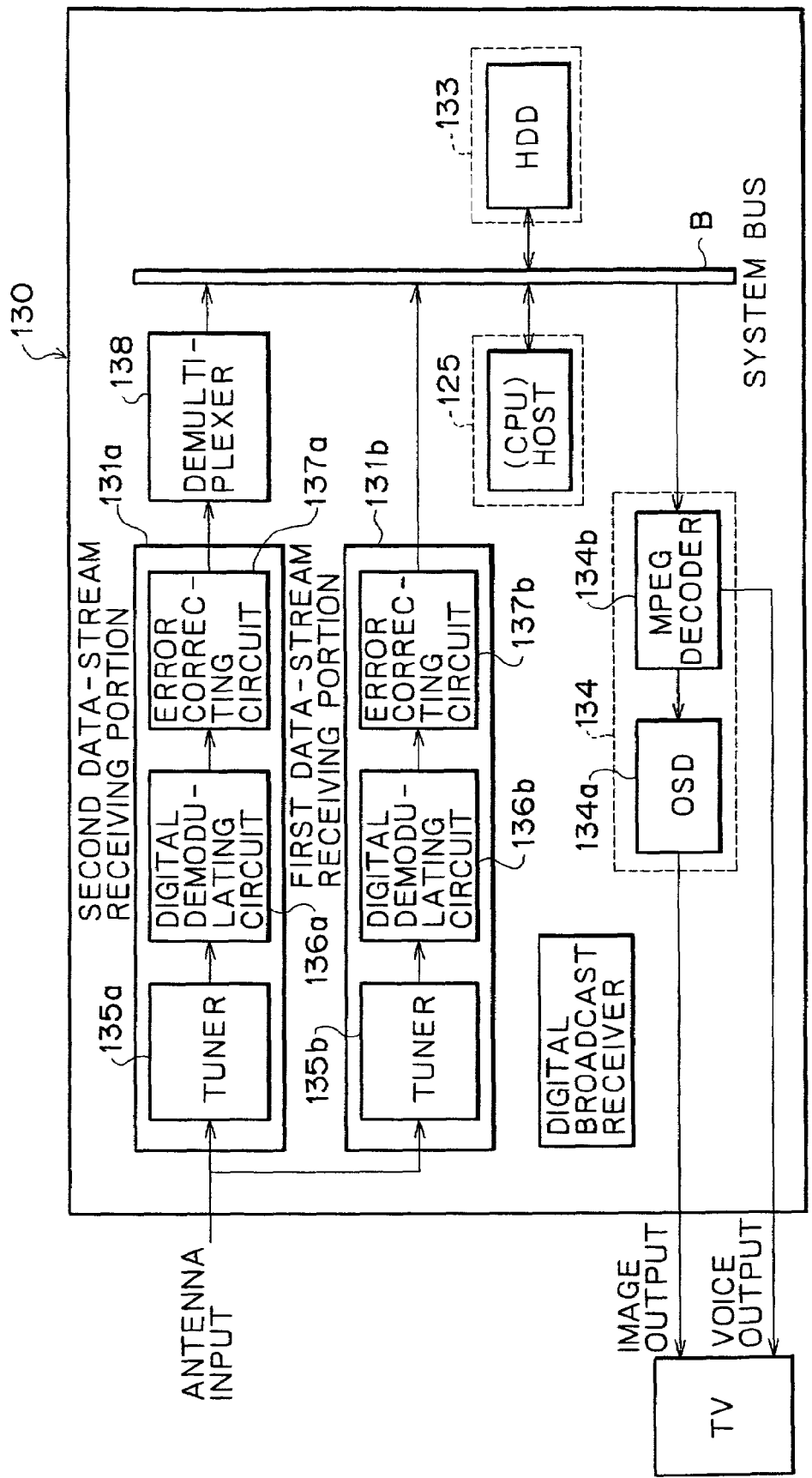
FIG. 11 is a block diagram illustrating a configuration example of a recording playback portion in the digital receiving device shown in FIG. 7.

Next, one of specific configurations of the receiving device 130 for receiving the first and the second data streams, which have been MPEG-encoded and multiplexed, is described with reference to FIG. 11.

This receiving device is configured as a hard disk recorder, which includes a second data-stream receiving portion 131a that receives the second data stream (television broadcast) by separating it from an antenna, and a first data-stream receiving portion 131b that receives the first data stream (data broadcast). The second data-stream receiving portion 131a and the first data-stream receiving portion 131b are connected to a first data-stream playback control portion 125, the first data-stream recording portion 133, and the first data-stream playback portion 134 via a system bus B.

The second data-stream receiving portion 131a includes a tuner 135a capable of receiving the second data stream (television broadcast), a digital demodulation circuit 136a for demodulating a signal received by this tuner 135a, and an error-correction circuits 137a for correcting an error. Image and voice data of the demodulated data broadcast are demultiplexed by demultiplexer 138, and are supplied to the system bus B. As a result, the data can be output to a television receiver (TV) as appropriate.

The first data-stream receiving portion 131b includes a tuner 135b capable of receiving the first data stream (data broadcast) having a transmission rate of about 2 Mbps, a digital demodulation circuit 136b for demodulating a signal received by this tuner 135b, and an error-correction circuit 137b for correcting an error. This demodulated first data stream (data broadcast) is recorded in the recording portion 133.

The recording portion 133 has a hard disk (HDD) with recording capacity of about 38 GB, and is controlled so that it records only the first data stream (data broadcast). In this connection, the recording capacity of the hard disk is not limited to 38 GB. As a matter of course, it's setting can be changed as appropriate. If the hard disk has 38 GB for the recording capacity, and when a transmission rate is 4 Mbps, the hard disk can record the data for about 20 hours. This hard disk (HDD) may be built into, or added externally to, the television receiver (TV).

In addition, the recording portion 133 is controlled so that a genre (field) with a high viewing frequency is recorded by priority; or it is controlled so that a first data stream in a genre specified beforehand is recorded for preference.

For example, by processing users' viewing history statistically, it is possible to determine the genre with a high viewing frequency periodically. In response to a result of the determination, the first data stream in the genre can be recorded for preference. Alternatively, by using a mode setting for allowing a user to select a desired genre, it is possible to record the first data stream in the desired genre in response to a result of the selection.

As genres used here, the following can be used: classification relating to program contents including, for example, 'Movies', 'Music', 'Sports', 'News' and 'Documents'; classification relating to attributes of electronic-commerce commodities including, for example, 'Apparel', 'Foods', and 'Events'; and others.

The playback control portion 125 includes a central processing unit (CPU), and controls the playback portion 134 so that playback of the first data stream (data broadcast) becomes possible after the first data stream is totally recorded.

The playback portion 134 has a MPEG decoder 134a and an OSD (On Screen Display) 134b, and outputs image and voice data of the first data stream (databroadcast) to the television receiver (TV).

In this manner, the first data stream (data broadcast), which is transmitted from the transmission device at an extremely narrow-band transmission rate, is recorded on the hard disk as a recording medium. In this connection, playback of the first data stream becomes possible after the first data stream is totally recorded. As a result, although the transmission rate is lower than the original coding rate, it is possible to display the first data stream normally without interruption.

Figure 12:
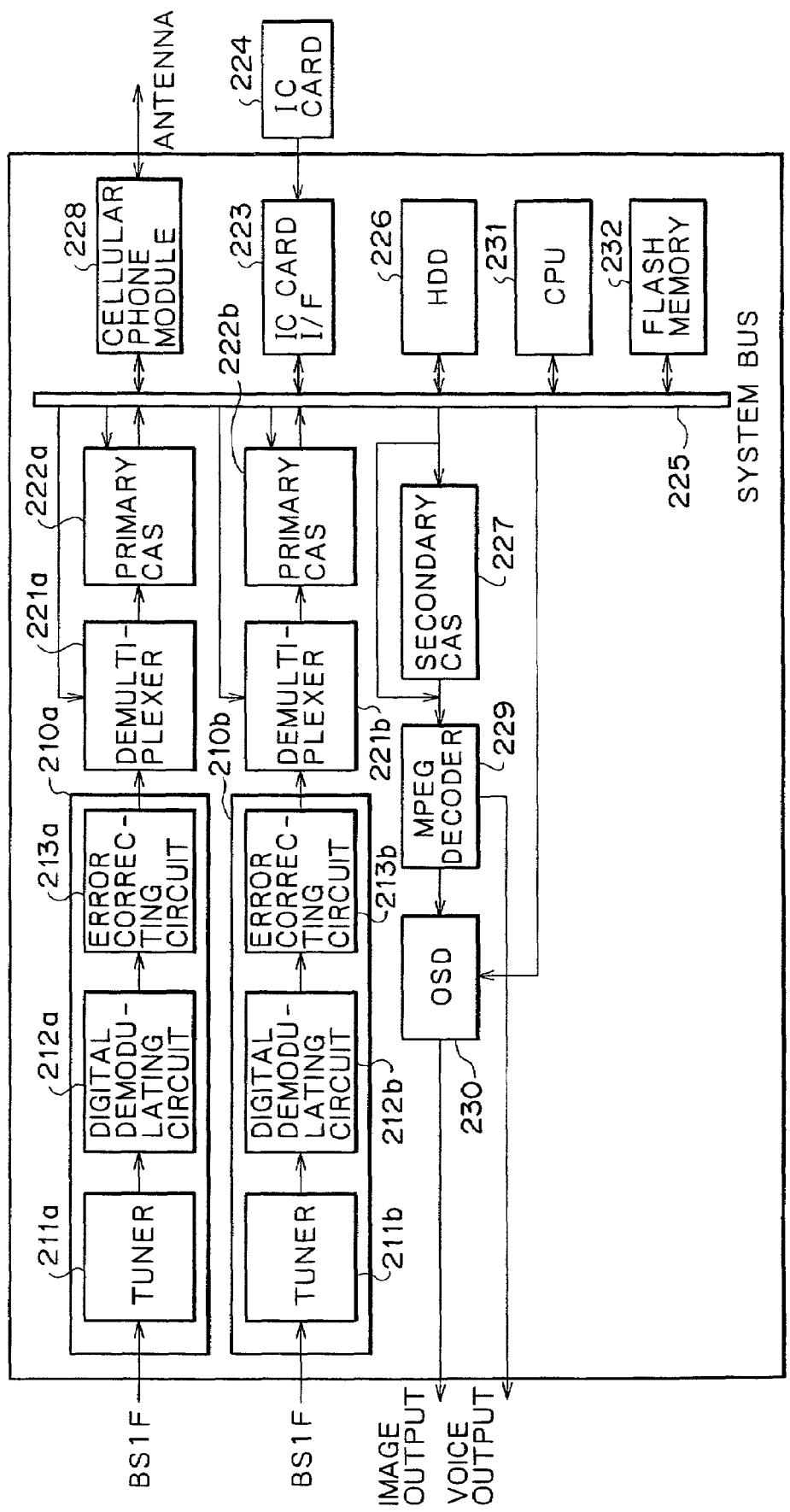
FIG. 12 is a block diagram illustrating another configuration example of the recording playback portion in the digital receiving device shown in FIG. 7.

Next, another receiving device in the embodiment is described with reference to FIG. 12.

This receiving device is configured as a hard-disk recorder having a first and a second charging (CAS) functions. In the following explanation, operation procedures on a user side in addition to a configuration and operation of the hard-disk recorder are described.

This hard-disk recorder receives a digital broadcasting signal using an outside satellite antenna. After that, the hard-disk recorder inputs an intermediate-frequency signal, which has been converted by a converter of the satellite antenna, to digital tuners 211a and 211b of data-stream receiving portions 210a and 210b of a front-end portion, respectively.

The digital tuners 211a and 211b convert the inputted intermediate frequency signals into base band signals, and then output the converted signals to digital demodulation circuits 212a and 212b, respectively. The digital demodulation circuits 212a and 212b demodulate the inputted signal, and then output the demodulated signal to error-correction circuits 213a and 213b, respectively.

The error-correction circuits 213a and 213b correct an error of the demodulated data, which has been input from the digital demodulation circuits 212a and 212b, and then output the corrected data to demultiplexers 221a and 221b, respectively.

The demultiplexers 221a and 221b select a stream from one inputted transmission channel according to a user's instruction, and then output the selected stream to first CAS portions 222a and 222b.

The first CAS portions 222a and 222b descramble a cryptogram of the stream, which has been supplied from the demultiplexer 221a and 221b, respectively, according to a key stored in an IC card 224 inserted in an IC-card interface 223. If recording is instructed, the first CAS portions 222a and 222b supply the stream to a hard disk drive 226 via a system bus 225.

Moreover, if real-time viewing is instructed, outputs of the first CAS portions 222a and 222b are supplied to a second CAS portion 227.

The second CAS portion 227 accesses a given server through a key stored beforehand (public key) or a cellular phone module 228. When the inputted stream is encrypted, the second CAS portion 227 decodes (descrambles) the cryptogram according to the obtained key (public key), and then outputs it to a MPEG decoder 229.

The MPEG decoder 229 decodes the inputted stream by means of MPEG method, supplies image signals to OSD (On Screen Display) circuits 230, multiplexes image and text data based on a given OSD data, and then outputs the data to a display device for displaying them. In addition, the audio signal, which has been output from the MPEG decoder 229, is output to a speaker, and the like.

By the way, if a plurality of digital tuners are equipped, the processing described above can be performed on different channels at the same time; or different streams can be recorded at the same time.

A CPU 231 controls operation of each portion described above in response to a user's instruction. A flash memory 232 stores various kinds of data and programs as necessary.

When the user uses EPG (Electronic Program Guide) to instruct that viewing and recording are performed, program specifying information, such as a broadcasting-station identifier and a program identifier included in the EPG data, is checked whether the information is matched with data including a network identification descriptor, a partial-transport-stream time descriptor, and a broadcasting ID descriptor in SIT (Selection Information Table) transmitted together with the stream. Then, PID (Packet Identifier) of a required stream is supplied to a demultiplexer circuit. As a result, filtering becomes possible.

If the received stream is a billing object, the stream is checked whether it is a stream for which billing is required by ECM (Entitlement Control Message) and EMM (Entitlement Management Message) that are transmitted together with the image and voice stream.

After that, if billing processing is required only for the first CAS, data required by ECM and EMM is output to the IC card through an IC-card interface circuit. Then, key information based on a result of processing in the IC card is obtained to perform descrambling in the first CAS circuit.

Moreover, when an order of commodity or service is placed from a television screen, the CPU reads out a telephone number of a server to be connected, which has been stored in the flash memory and the like beforehand, in response to the commodity or the service selected by the user, and then instructs the cellular phone module to connect to the server.

The cellular phone module originates a call to the telephone number to be connected according to the connection instruction. The cellular phone module waits for a connection response from the server to be connected. Once the connection is established, the cellular phone module obtains information about the selected distribution or the selected service from the server, and displays it on the display device as necessary. When the user performs purchase operation, the CPU transmits a purchase-procedure instruction to the server.

In response to a request from the server, data including a device-specific number and a user identification number is transmitted for user authentication. When information notifying completion of the purchase procedure and its accompanying information are transmitted from the server, the information is displayed on the display device as necessary. After that, when the user performs exiting operation, the connection of the cellular phone module is disconnected. The CPU stores information such as a purchase history in the flash memory and the like. At a future date, the information is used for displaying a purchase-history list in response to a user's request.

Figure 14:
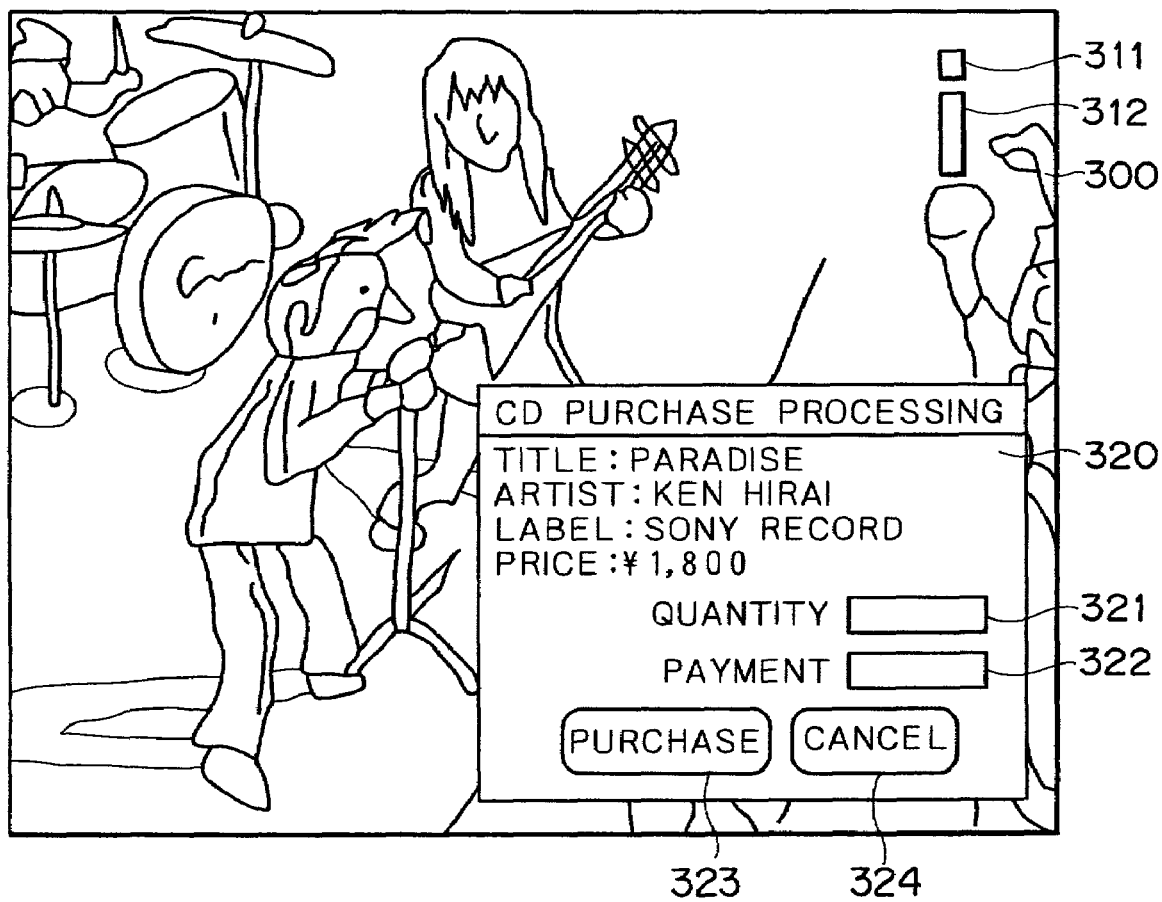
FIG. 14 is a block diagram illustrating a specific example of a screen for ordering commodities in the digital receiving device shown in FIG. 7.
Figure 15:
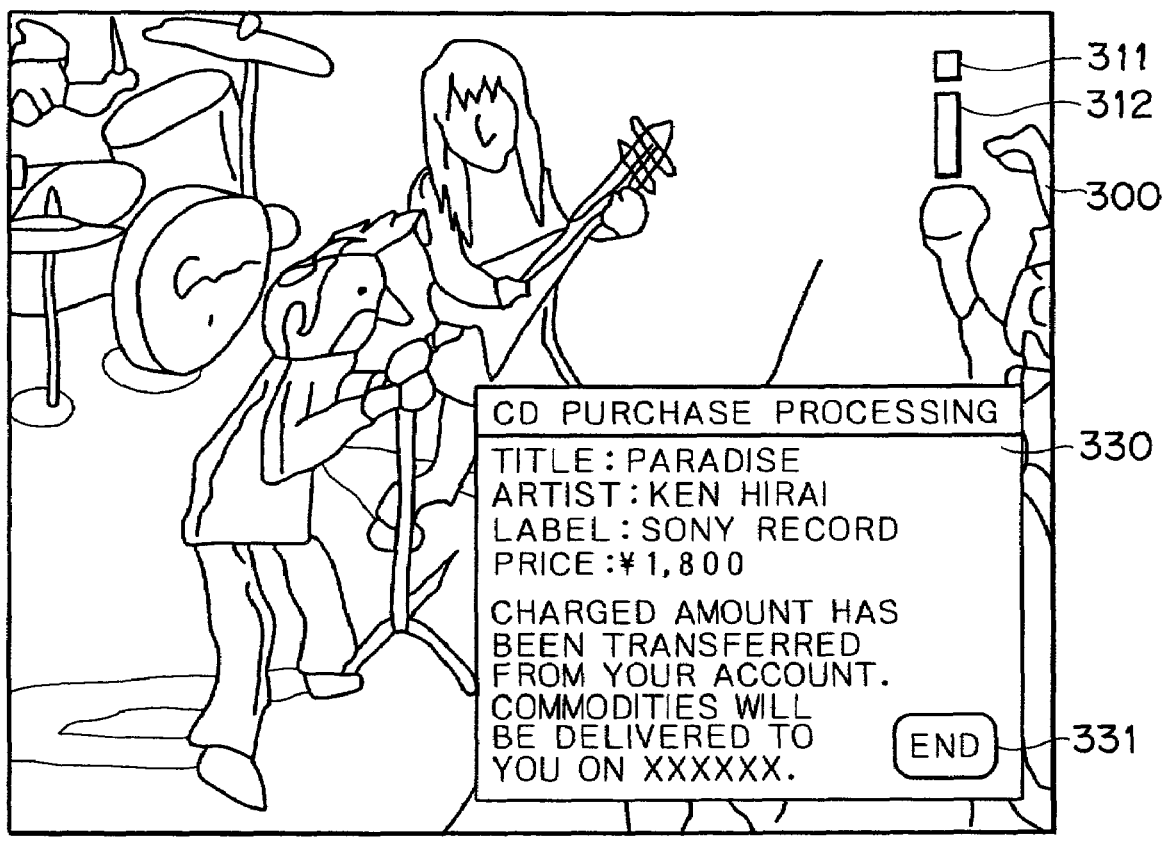
FIG. 15 is a block diagram illustrating a specific example of a screen for confirming a purchase of commodities in the digital receiving device shown in FIG. 7.

Next, playback operation of the first data stream accumulated by the hard-disk recorder as described above is described using schematic diagrams of display screens shown in FIGS. 13, 14, and 15.

First of all, contents reproduced in the hard disk are played back. If purchase of commodities or services is allowed, as shown in FIG. 13, icons 311 and 312 are presented for an audience in a screen 300 displaying animation for example, which prompts the audience to perform purchase operation.

When the audience presses an operation button for a purchase action at will (for example, the audience clicks the icon), as shown in FIG. 14, a window 320 for detail information including commodities and services is displayed (a screen shown in FIG. 14 illustrates a display used when CD is purchased).

The user inputs purchase quantity and a payment method and the like to each of input columns 321, 322 according to a screen in this window 320. Then, the user selects a 'Purchase' button 323 to perform the purchase action; or selects a "Cancel" button 324 to cancel the purchase action.

Additionally, when the "Purchase" button 323 is selected, payment processing with a bank and a credit company is performed according to a method specified by the inputted payment method (for example, bank account transfer, credit card, etc.).

After completion of this payment processing, commodity, service, or the like is ordered; stock is checked; information about a delivery date is obtained from a sales company or a distributor; and as shown in FIG. 15, its result is displayed on the screen 300 using a window 330. After that, selecting an "Exit" button 331 exits the purchase processing.

By the way, button display, which imitates colors of four-color keys (blue, red, yellow, and green) used for data broadcast, may be used as those buttons.

As above, the embodiments according to the present invention are described. The present invention, however, is not limited to the embodiments described above. The present invention can be modified furthermore.

For example, in the above-mentioned embodiment, the case, where the first and the second data streams are multiplexed and transmitted, is described. However, for a system that allocates a similar data stream to a program broadcasting band and a data broadcasting band to transmit them, it is also possible to achieve a similar effect by controlling a transmission side so that a sum of the program broadcasting band and the data broadcast band does not exceed a given band width, and by recording the data stream for the data broadcasting band on a hard disk on a receiving side for use.

Moreover, as a recording medium, not only a hard disk but also other medium can be used.

Figure 16:
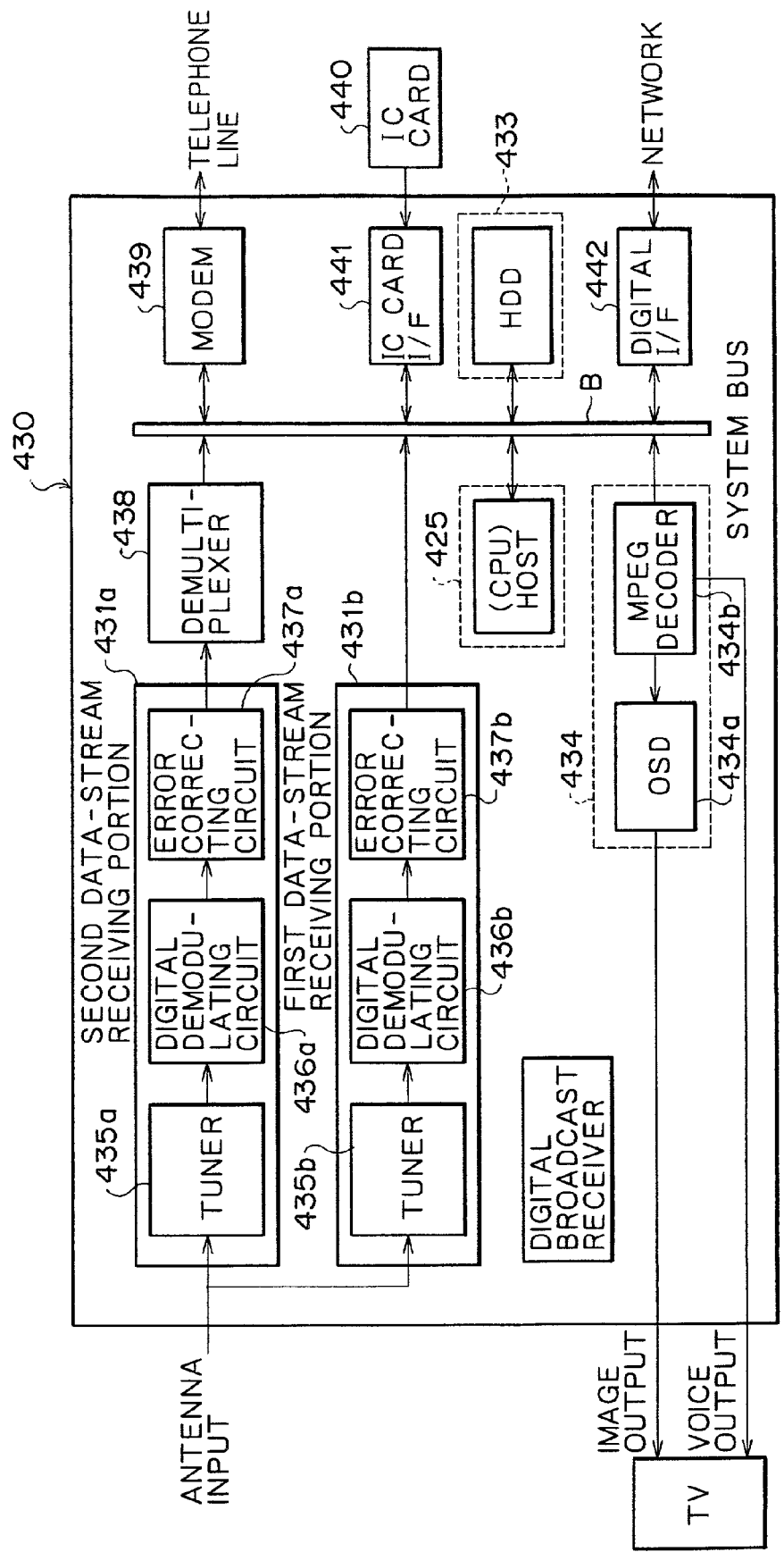
FIG. 16 is a block diagram illustrating another configuration example of the recording playback portion in the digital receiving device shown in FIG. 7.

Next, other configurations of the receiving device 130 as a recording playback device for receiving the first and the second data streams, which have been MPEG-encoded and multiplexed, is described with reference to FIG. 16.

The receiving device has a second data-stream receiving portion 431a that receives the second data stream (television broadcast) by separating it from an antenna, and a first data-stream receiving portion 431b that receives the first data stream (data broadcast). The second data-stream receiving portion 431a and the first data-receiving portion 431b are connected to a control portion 425, a recording portion 433, and a playback portion 434 via a system bus.

The second data-stream receiving portion 431a includes a tuner 435a capable of receiving the second data stream (television broadcast), a digital demodulation circuit 436a for demodulating the signal received by this tuner 435a, and an error-correction circuit 437a for correcting an error. Concerning image and voice data of the data broadcast, which has been demodulated by the second data-stream receiving portion 431a, a demultiplexer 438 separates the multiplexed signal, and the separated data is supplies to the system bus B. As a result, the data can be output to a television receiver (TV) as appropriate.

The first data-stream receiving portion 431b includes a tuner 435b capable of receiving the first data stream (data broadcast) having a transmission rate of about 2 Mbps, a digital demodulation circuit 436b for demodulating a signal received by this tuner 435b, and an error-correction circuit 437b for correcting an error. This demodulated first data stream (data broadcast) is recorded in the recording portion 433. This recording portion 433 is controlled so that, when a size of a recording area for the first data stream becomes lower than or equal to a given size or zero during recording, the oldest first data stream (the first data stream having the earliest recording date) from among the first data streams, which have been recorded, is deleted to record a new first data stream. In addition, the recording portion 33 is controlled so that a first data stream in a genre with a high viewing frequency is recorded for preference. It may also be controlled so that the first data stream in a genre specified beforehand is recorded for preference.

The recording portion 433 has a hard disk (HDD) with recording capacity of about 38 GB, and is controlled so that it records the first data stream (data broadcast) and the second data stream. In this connection, the recording capacity of the hard disk is not limited to 38 GB. As a matter of course, its setting can be changed as appropriate. Moreover, this hard disk (HDD) may be built into, or added externally to the television receiver (TV).

The playback control portion 425 has a central processing unit (CPU), and controls the playback portion 434 so that playback of the first data stream (data broadcast) becomes possible after the first data stream is totally recorded. In addition to this, the playback control portion 425 controls the second data stream, which has been recorded in the recording portion 433, so that it is played back.

The playback portion 434 includes a MPEG decoder and an OSD (On Screen Display), and decodes the second data stream as well as image and voice data of the first data stream (data broadcast) to output them to the television receiver (TV).

Furthermore, the system bus B is connected to a modem 439 connected to a telephone cable, which is connected to an outside telephone network, an IC card I/F 441, into which an IC card 440 can be inserted, and a digital I/F 442 that can be connected to a network. The IC card 440 is used specially when, in a receiving device 430, an access to e-commerce of the first data stream (data broadcast) recorded in the HDD 433 becomes chargeable.

In this manner, the first data stream (data broadcast), which is transmitted from the transmission device at an extremely narrow-band transmission rate, is recorded on the hard disk. In this connection, playback of the first data stream becomes possible after the first data stream is totally recorded. As a result, although the transmission rate is lower than the original coding rate, it is possible to display the first data stream normally without interruption.

Figure 17:
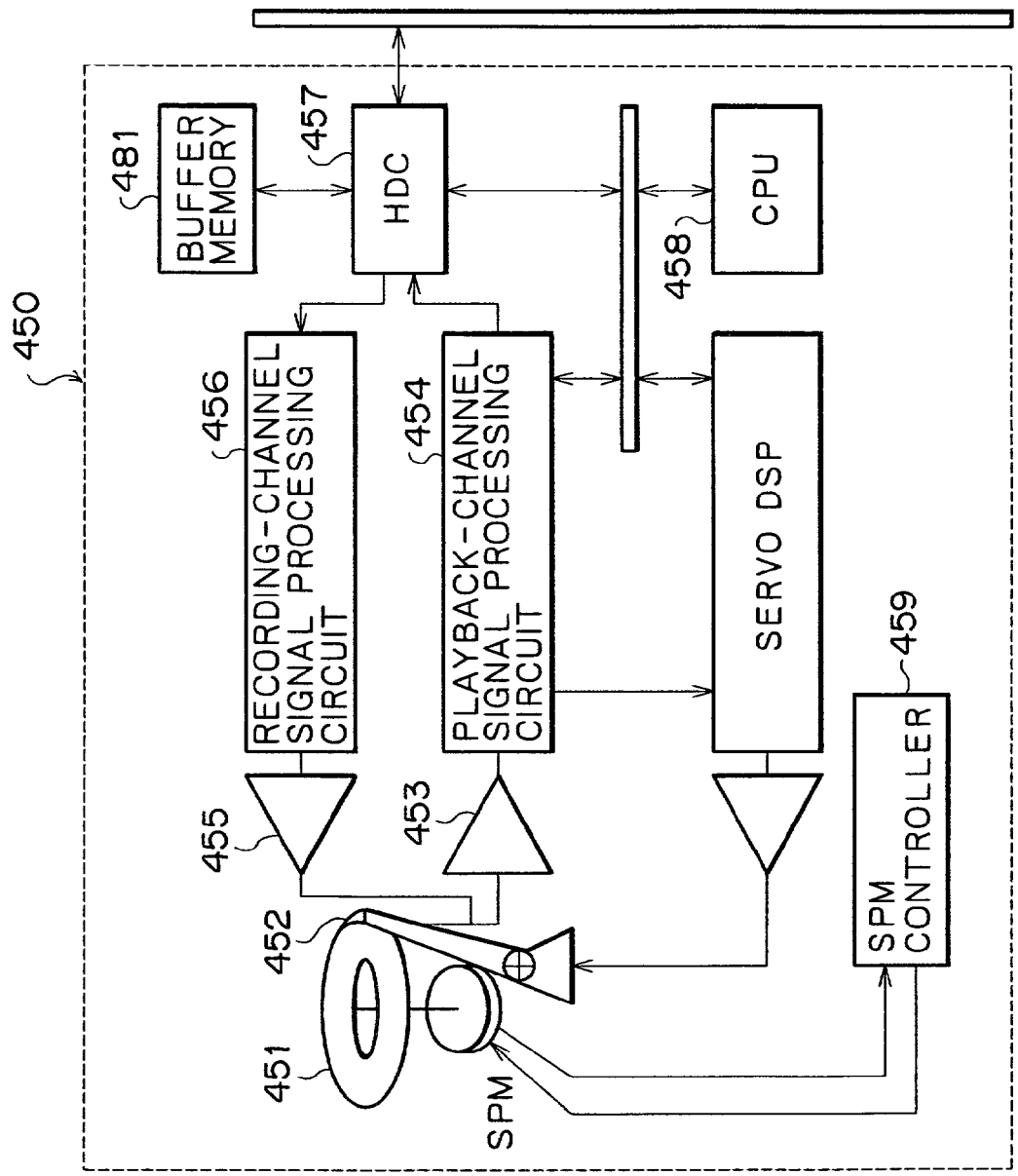
FIG. 17 is an explanatory diagram illustrating a specific example of a HDD shown in FIG. 16.

A hard-disk drive (HDD) 33, which is a recording portion, includes a HDD unit 450 as shown in FIG. 17. The HDD unit 450 includes a disk 451 as a recording medium, a head 452 for reading and writing on the disk 451, an amplifier 453 for amplifying a signal from the head 452, a playback-channel signal processing circuit 454 for processing this amplified signal, an amplifier 455 for writing to the disk 451 using the head 452, a recording-channel signal processing circuit 456; a SPM controller 459 for controlling rotation of the disk 451, and a controller 457 for controlling transmission and reception of a recording and playback signal to and from the data-stream playback portion 434 via the system bus B. Here, a provider area and an user area are separated on the disk 451. In other words, each of the provider area and the user area is specified beforehand as a specific area.

Figure 18:
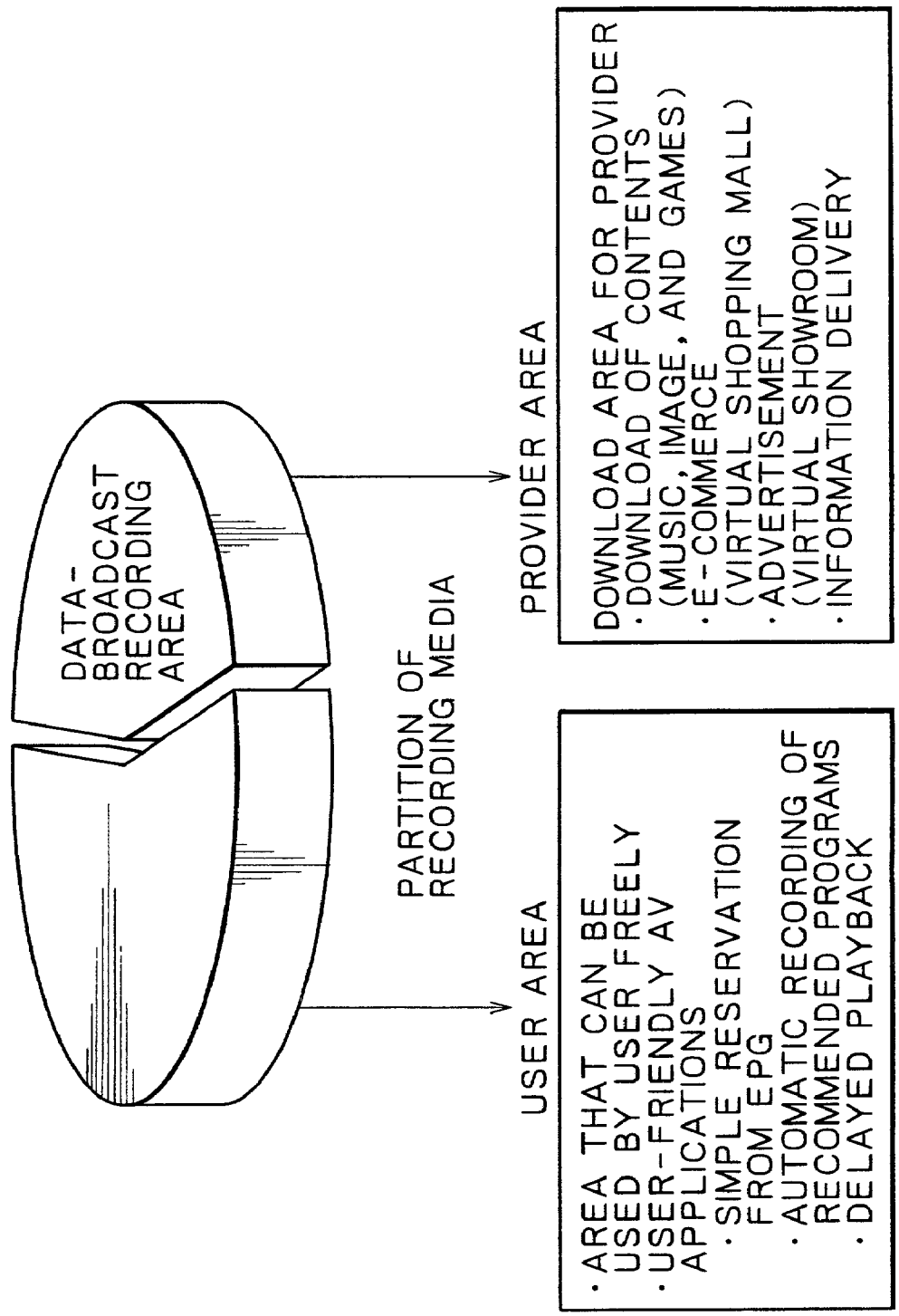
FIG. 18 is an explanatory diagram illustrating how a disk shown in FIG. 17 is divided.
Figure 19:
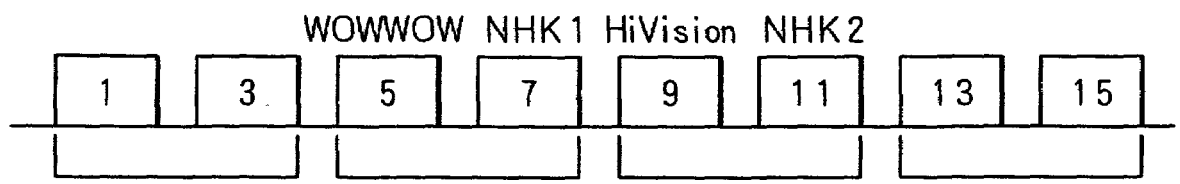
FIG. 19 is a brief explanatory diagram illustrating a configuration of MPEG-TS.
Figure 20:
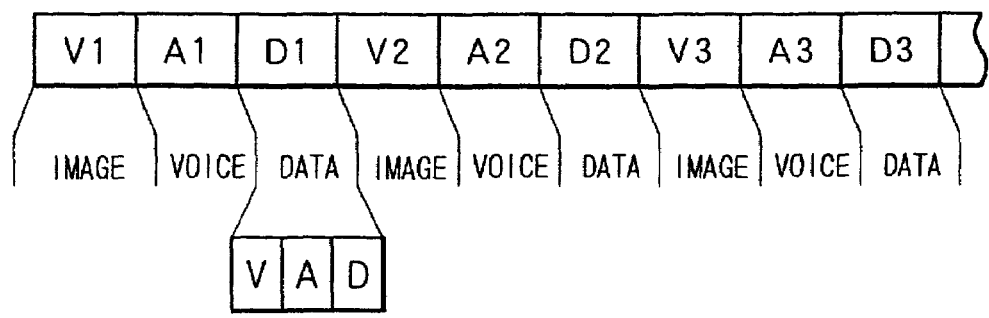
FIG. 20 is an explanatory diagram illustrating operation of transponders of an artificial satellite used for satellite broadcasts.

As shown in FIG. 18, the disk 451, which is a recording medium of the HDD unit 450, is divided into two areas by partitions. The divided areas constitute the provider area and the user area. The user area is an area that can be used by users freely. The user area is, for example, used for storing the second data stream that has been received; image and voice data including an input from outside that is not shown in the diagram; and AV applications. For example, the user area can be used for simple reservation from EPG (electronic program guide), automatic recording and playback of recommended programs, and the like. In the provider area, in the embodiment, contents of the first data stream are mainly recorded. More specifically, the provider area is used for: performing download for provider; downloading contents including music, video, and games; providing a virtual shopping mall by means of e-commerce; providing an advertisement such as a virtual showroom; delivering information; and the like. Thus, it is possible to control those areas so that one area is privately used and the other area is used for data broadcasts other than television-program broadcasts.

While a preferred embodiment of the invention has been described using specific terms, such description is for illustrative purpose only, and it is to be understood that changes and variations may be made without departing from the spirit or scope of the following claims.

What is claimed is:

1. A data transmission device comprising:
   a first generator for generating a first data stream that is utilized after the first data stream is accumulated in a recording medium on a receiving side;
   a second generator for generating a second data stream that includes audio data and video data;
   a multiplexer for multiplexing the first data stream at a first coding rate and for additionally multiplexing the first data stream having the first coding rate into the second data stream by changing a transmission rate of the first data stream to a second coding rate lower than the first coding rate;
   a transmitter for transmitting the multiplexed data stream that has been multiplexed by the multiplexer; and
   a controller for controlling the multiplexer so that the transmission rate for the first data stream becomes lower than that for the second data stream.

2. A data transmission device according to claim 1, wherein said first data stream includes data relating to an electronic-commercial transaction.

3. A data transmission device according to claim 1, wherein said first data stream includes audio data and video data.

4. A data receiving device comprising:
   a receiver for receiving a multiplexed data stream, in which a first data stream, which is utilized after the first data stream is accumulated in a recording medium on a receiving side, and a second data stream including audio data and video data are multiplexed into the multiplexed data stream in such a manner that the first data stream having a first coding rate is multiplexed into the second data stream by changing a transmission rate of the first data stream to a second coding rate lower than the first coding rate wherein the transmission rate for the first data stream becomes lower than that for the second data stream;
   a separator for separating the multiplexed data stream, which has been received by the receiver, into the first data stream and the second data stream; and
   a recorder for recording the first data stream, which has been separated by the separator, on a recording medium.

5. A data receiving device according to claim 4, wherein said first data stream includes data relating to electronic-commercial transaction.

6. A data receiving device according to claim 4, wherein said first data stream includes audio data and video data.

7. A data receiving device according to claim 4, wherein said recorder records a first data stream, which is in a field with a high user-viewing frequency, for preference.

8. A data receiving device according to claim 4, wherein said recorder records a first data stream, which is in a field specified beforehand, for preference.

9. A data receiving device according to claim 4, wherein said recorder includes a hard disk as a recording medium.

10. A data receiving device according to claim 4, wherein said recorder comprises an outputter for outputting a user's viewing history visually.

11. A transmission device comprising:
    transmitting means for transmitting a first data stream, which includes audio data and video data, using a program broadcasting band, and transmitting a second data stream, which is utilized after the second data stream is accumulated in a recording media on a receiving side, by allocating the second data stream to a data broadcasting band and a transmission rate of the second data stream is lower than a coding bit rate of the second data stream; and controlling means for controlling the program broadcasting band and the data broadcasting band so that a sum of the bands does not exceed a given bandwidth.

12. A receiving device comprising:
receiving means for receiving a broadcast in which a data stream including audio data and video data is transmitted using a program broadcasting band and other data stream, the other data stream is utilized after the other data stream is accumulated in a recording media on a receiving side, the other data stream is transmitted using a data broadcasting band to which the other data stream is allocated, a transmission rate of the other data stream is lower than a coding bit rate of the other data stream and the program broadcasting band and the data broadcasting band are controlled so that a sum of the bands does not exceed a given bandwidth;
separating means for separating the data stream, which has been allocated to the data broadcasting band, from the broadcast that has been received by the receiving means; and
recording means for recording the separated data stream.

13. A data transmitting method comprising the step of:
generating a first data stream that is utilized after the first data stream is accumulated in a recording medium on a receiving side;
generating a second data stream that includes audio data and video data; and
multiplexing the first data stream at a first coding rate and additionally multiplexing the first data stream having the first coding rate into the second data stream by changing a transmission rate of the first data stream to a second coding rate lower than the first coding rate;
transmitting the multiplexed data stream that has been multiplexed from the first data stream and the second data stream;
wherein said multiplexed data stream is multiplexed in such a manner that the transmission rate for the first data stream becomes lower than that for the second data stream.

14. A data transmitting method according to claim 13, wherein said first data stream includes data relating to electronic-commercial transaction.

15. A data transmitting method according to claim 13, wherein said first data stream includes audio data and video data.

16. A data receiving method comprising the step of:
receiving a multiplexed data stream that is multiplexed from a first data stream, which is utilized after the first data stream is accumulated in a recording medium on a receiving side, and a second data stream including audio data and video data in such a manner that the first data stream having a first coding rate is multiplexed into the second data stream by changing a transmission rate of the first data stream to a second coding rate lower than the first coding rate wherein a transmission rate for the first data stream becomes lower than that for the second data stream;
separating the multiplexed data stream, which has been received, into the first data stream and the second data stream; and
recording the first data stream, which has been separated, on a recording medium.

17. A data receiving method according to claim 16, wherein said first data stream includes data relating to electronic-commercial transaction.

18. A data receiving method according to claim 16, wherein said first data stream includes audio data and video data.

19. A data receiving method according to claim 16, wherein a first data stream, which is in a field with a high user-viewing frequency, is recorded for preference on said recording medium.

20. A data receiving method according to claim 16, wherein a first data stream, which is in a field specified beforehand, is recorded for preference on said recording medium.

21. A transmitting method comprising the step of:
transmitting a data stream including audio data and video data, using a program broadcasting band, and transmitting other data stream, which is utilized after the other data stream is accumulated in a recording media on a receiving side, by allocating the other data stream to a data broadcasting band and a transmission rate of the other data stream is lower than a coding bit rate of the other data stream; and
controlling the program broadcasting band and the data broadcasting band so that a sum of the bands does not exceed a given bandwidth.

22. A receiving method comprising the step of:
receiving a broadcast in which a data stream including audio data and video data is transmitted using a program broadcasting band and other data stream, the other data stream is utilized after the other data stream is accumulated in a recording media on a receiving side, the other data stream is transmitted using a data broadcasting band to which the other data stream is allocated, a transmission rate of the other data stream is lower than a coding bit rate of the other data stream and the program broadcasting band and the data broadcasting band are controlled so that a sum of the bands does not exceed a given bandwidth,
and wherein
recording the data stream, which has been allocated to the data broadcasting band, from the broadcast received by said receiving step.

23. A data transmission device according to claim 1, wherein a maximum transmission rate for said multiplexed data stream is 24 Mbps.

24. A data transmission device according to claim 23, wherein a transmission rate for said first data stream is about 2 Mbps.

25. A data receiving device according to claim 4, wherein a maximum transmission rate for said multiplexed data stream is 24 Mbps.

26. A data receiving device according to claim 25, wherein a transmission rate for said first data stream is about 2 Mbps.

27. A transmission device according to claim 11, wherein a sum of said program broadcasting band and said data broadcasting band is 24 Mbps.

28. A receiving device according to claim 12, wherein a sum of said program broadcasting band and said data broadcasting band is 24 Mbps.

29. A data transmitting method according to claim 13, wherein a maximum transmission rate for said multiplexed data stream is 24 Mbps.

30. A data transmitting method according to claim 29, wherein a transmission rate for said first data stream is about 2 Mbps.

31. A data receiving method according to claim 16, wherein a maximum transmission rate for said multiplexed data stream is 24 Mbps.

32. A data receiving method according to claim 31, wherein a transmission rate for said first data stream is about 2 Mbps.

33. A transmitting method according to claim 21, wherein a sum of said program broadcasting band and said data broadcasting band is 24 Mbps.

34. A receiving method according to claim 22, wherein a sum of said program broadcasting band and said data broadcasting band is 24 Mbps.

\* \* \* \* \*